United States Patent
Shimada et al.

(10) Patent No.: US 12,039,394 B2
(45) Date of Patent: Jul. 16, 2024

(54) RFID TAG, PET BOTTLE, AND ANTENNA

(71) Applicant: DAIO PAPER CORPORATION, Ehime (JP)

(72) Inventors: Takuro Shimada, Kagawa (JP); Daiji Matsunoshita, Kanagawa (JP)

(73) Assignee: DAIO PAPER CORPORATION, Ehime (JP)

( * ) Notice: Subject to any disclaimer, the term of this patent is extended or adjusted under 35 U.S.C. 154(b) by 206 days.

(21) Appl. No.: 17/596,856

(22) PCT Filed: Jul. 16, 2020

(86) PCT No.: PCT/JP2020/027740
§ 371 (c)(1),
(2) Date: Dec. 20, 2021

(87) PCT Pub. No.: WO2021/015102
PCT Pub. Date: Jan. 28, 2021

(65) Prior Publication Data
US 2022/0318588 A1  Oct. 6, 2022

(30) Foreign Application Priority Data

Jul. 19, 2019 (JP) ................ 2019-134033
Oct. 28, 2019 (JP) ................ 2019-195734

(51) Int. Cl.
*G06K 19/077* (2006.01)
*B65D 23/00* (2006.01)
(Continued)

(52) U.S. Cl.
CPC ....... *G06K 19/07775* (2013.01); *B65D 23/00* (2013.01); *G06K 19/07786* (2013.01);
(Continued)

(58) Field of Classification Search
CPC ....... G06K 19/07775; G06K 19/07786; H01Q 5/371; H01Q 1/2225; H01Q 1/2283; H01Q 7/00; H01Q 9/26; B65D 23/00
(Continued)

(56) References Cited

U.S. PATENT DOCUMENTS

2005/0162333 A1  7/2005  Kaneko et al.
2006/0176236 A1  8/2006  Homolle et al.
(Continued)

FOREIGN PATENT DOCUMENTS

JP  S61-218206  9/1986
JP  2000-222540  8/2000
(Continued)

OTHER PUBLICATIONS

Office Action dated Sep. 27, 2022 issued with respect to the basic Japanese Patent Application No. 2019-195734.
(Continued)

*Primary Examiner* — Michael G Lee
*Assistant Examiner* — David Tardif
(74) *Attorney, Agent, or Firm* — IPUSA, PLLC

(57) ABSTRACT

A RFID tag for placement on a surface of a container that contains a liquid is provided. The RFID tag includes an IC chip configured to store identification information, a loop conductor connected to the IC chip, and an antenna unit that includes two conductor units connected to the loop conductor and extending away from each other from the loop conductor.

15 Claims, 29 Drawing Sheets

(51) Int. Cl.
    *H01Q 1/22* (2006.01)
    *H01Q 5/371* (2015.01)
    *H01Q 7/00* (2006.01)
    *H01Q 9/26* (2006.01)

(52) U.S. Cl.
    CPC ......... *H01Q 1/2225* (2013.01); *H01Q 1/2283* (2013.01); *H01Q 5/371* (2015.01); *H01Q 7/00* (2013.01); *H01Q 9/26* (2013.01)

(58) Field of Classification Search
    USPC .......................................................... 235/492
    See application file for complete search history.

(56) References Cited

U.S. PATENT DOCUMENTS

| | | | |
|---|---|---|---|
| 2007/0145150 | A1 | 6/2007 | Barczyk et al. |
| 2008/0035741 | A1* | 2/2008 | Sakama ............ H01Q 7/00 235/492 |
| 2009/0109034 | A1 | 4/2009 | Chen et al. |
| 2011/0063184 | A1* | 3/2011 | Furumura ......... H01Q 7/00 343/856 |
| 2011/0241836 | A1 | 10/2011 | Yoshida et al. |
| 2015/0084645 | A1 | 3/2015 | Kayano et al. |
| 2018/0218249 | A1 | 8/2018 | Oda |
| 2019/0081402 | A1* | 3/2019 | Kato ............. H01Q 1/36 |
| 2019/0130239 | A1* | 5/2019 | Kimura ........... G06K 19/07788 |
| 2019/0379410 | A1 | 12/2019 | Kozakai et al. |

FOREIGN PATENT DOCUMENTS

| | | |
|---|---|---|
| JP | 2002-259934 | 9/2002 |
| JP | 2004-104344 | 4/2004 |
| JP | 2005-244926 | 9/2005 |
| JP | 2006-211683 | 8/2006 |
| JP | 2006-277524 | 10/2006 |
| JP | 2007-124443 | 5/2007 |
| JP | 2007-174295 | 7/2007 |
| JP | 2007-249620 | 9/2007 |
| JP | 2008-112441 | 5/2008 |
| JP | 2009-111986 | 5/2009 |
| JP | 2011-141858 | 7/2011 |
| JP | 2014-135012 | 7/2014 |
| JP | 2015-046729 | 3/2015 |
| JP | 2015-087378 | 5/2015 |
| JP | 2016-051438 | 4/2016 |
| JP | 2018-124771 | 8/2018 |
| WO | 2018/123263 | 7/2018 |

OTHER PUBLICATIONS

International Search Report mailed on Oct. 20, 2020 with respect to PCT/JP2020/027740 filed on Jul. 16, 2020.
Japanese Office Action for 2019-195734 mailed on Mar. 14, 2023.

* cited by examiner

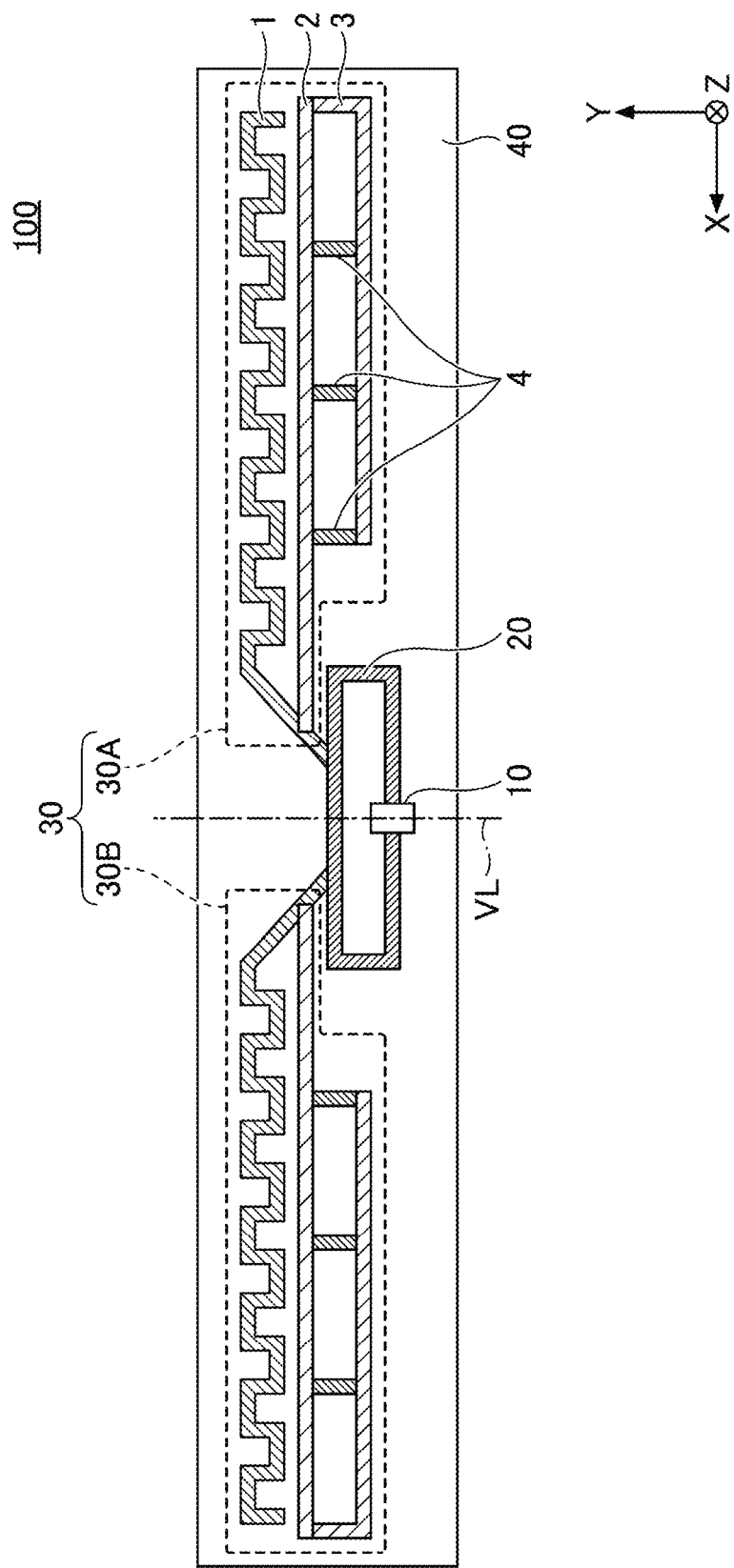

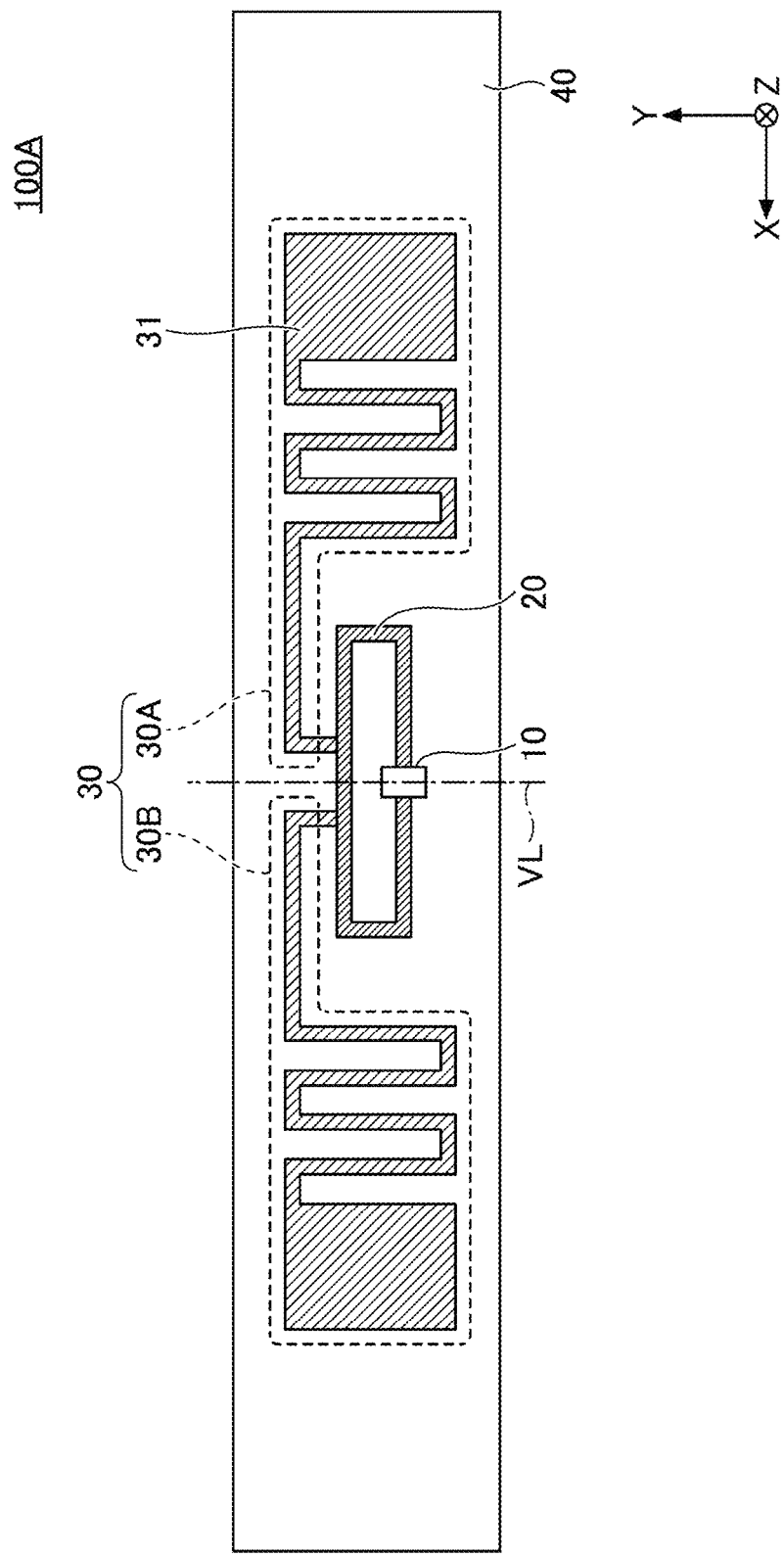

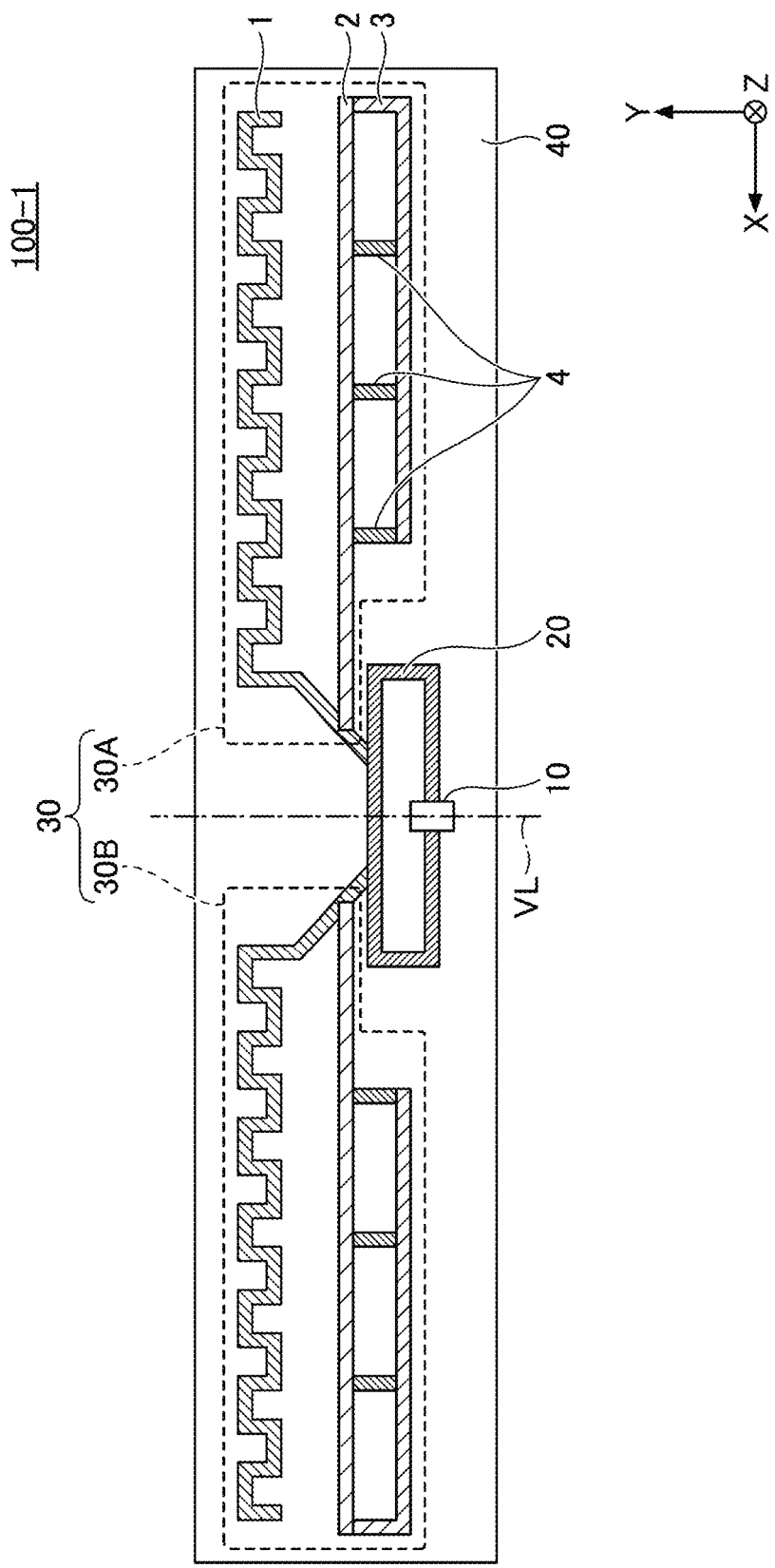

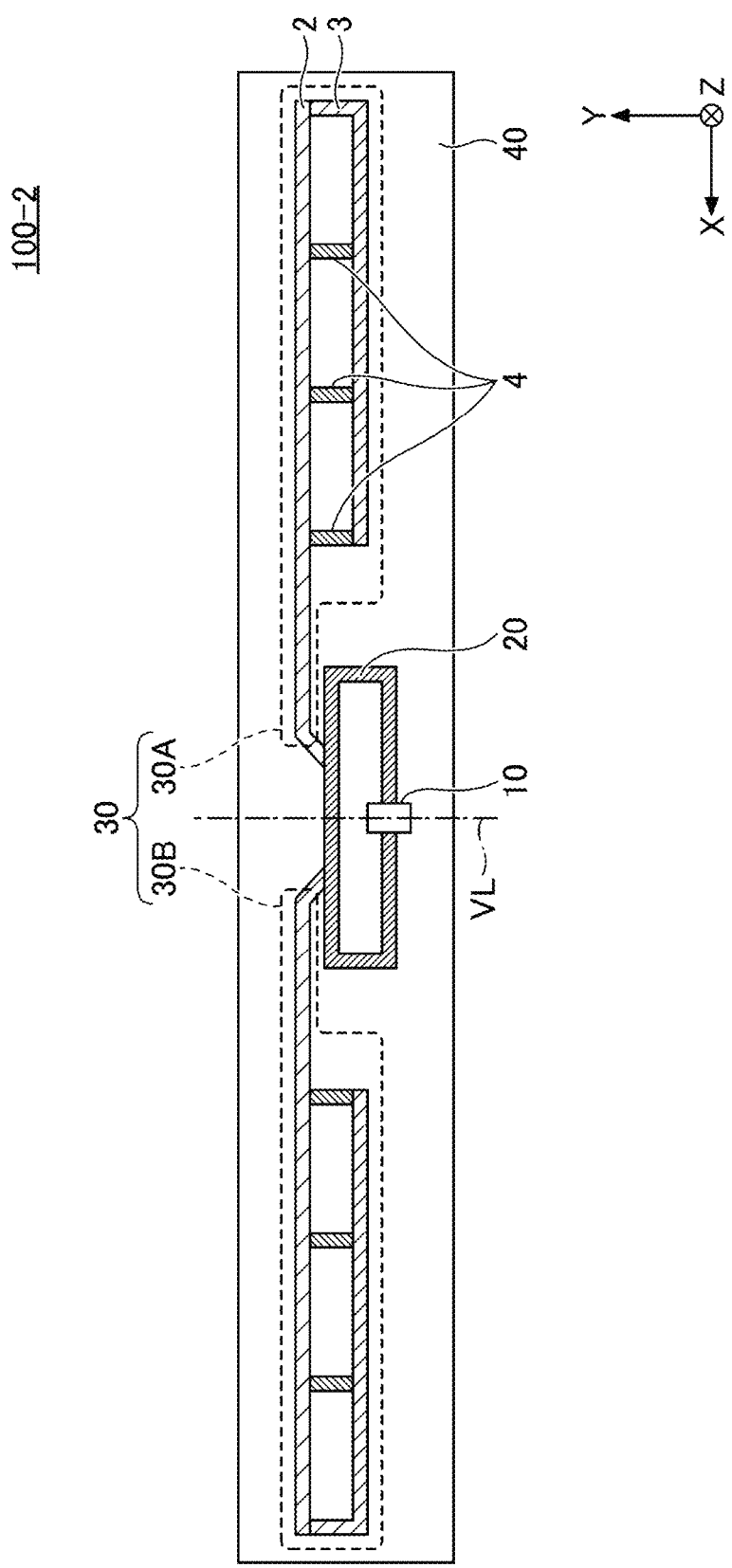

RFID TAG, PET BOTTLE, AND ANTENNA

TECHNICAL FIELD

The present invention relates to a radio frequency identification (RFID) module, a polyethylene terephthalate (PET) bottle, and an antenna.

BACKGROUND ART

RFID labels, which are attached to objects, are widely used for logistics management and product management. An RFID label is a label having an RFID tag. The RFID tag includes an IC chip and an antenna electrically connected to the IC chip. The RFID tag may also be referred to as a wireless tag, an IC tag, a RF-ID tag, or a RF tag. If an object to which a RFID label is attached is a container containing a liquid, such as a beverage PET bottle, it may be difficult to successfully read identification information. This is considered to be because, if an antenna is located near a liquid, the antenna characteristics may change due to the influence of the liquid, radio waves may be absorbed in the liquid, and so on.

Patent Document 1 discloses a RFID label that allows identification information to be successfully read even if a liquid, which may affect the reading of the identification information, is contained in a container. The RFID label disclosed in Patent Document 1 has a structure in which a tag including an antenna projects from the container. Accordingly, the distance between the antenna and the object increases, thus allowing identification information stored in the RFID label to be successfully read.

RELATED-ART DOCUMENTS

Patent Documents

Patent Document 1: Japanese Laid-Open Patent Publication No. 2006-277524

SUMMARY OF THE INVENTION

Problem to be Solved by the Invention

However, in the related-art technology disclosed in Patent Document 1, because the tag including the antenna projects from the container, the antenna may be damaged or the like during the storage or transport of the container. Therefore, the technology disclosed in Patent Document 1 has scope for improvement.

The present invention is made in light of the above, and has an object to provide a RFID tag that allows identification information to be read successfully without damage to an antenna or the like during the handling of a container.

Means to Solve the Problem

In order to solve the above-described problem, according to the present invention, a RFID tag for placement on a surface of a container that contains a liquid is provided. The RFID tag includes an IC chip configured to store identification information, a loop conductor connected to the IC chip, and an antenna unit that includes a linear element. The linear element includes two linear-shaped conductors connected to the loop conductor, extending away from each other from the loop conductor, and each having an electrical length that is a multiple of approximately ¼ of a wavelength of a frequency used.

Effects of the Invention

According to the present invention, identification information can be read successfully without damage to an antenna or the like during the handling of a container.

BRIEF DESCRIPTION OF THE DRAWINGS

FIG. 2 is a diagram illustrating an example configuration of the RFID tag;

FIG. 4 is a diagram illustrating an example configuration of a RFID tag according to a comparative example of the present invention;

FIG. 6 is a diagram illustrating example configuration of a RFID tag according to a first modification;

FIG. 8 is a diagram illustrating example configuration of a RFID tag according to a second modification;

MODE FOR CARRYING OUT THE INVENTION

Figure 1:
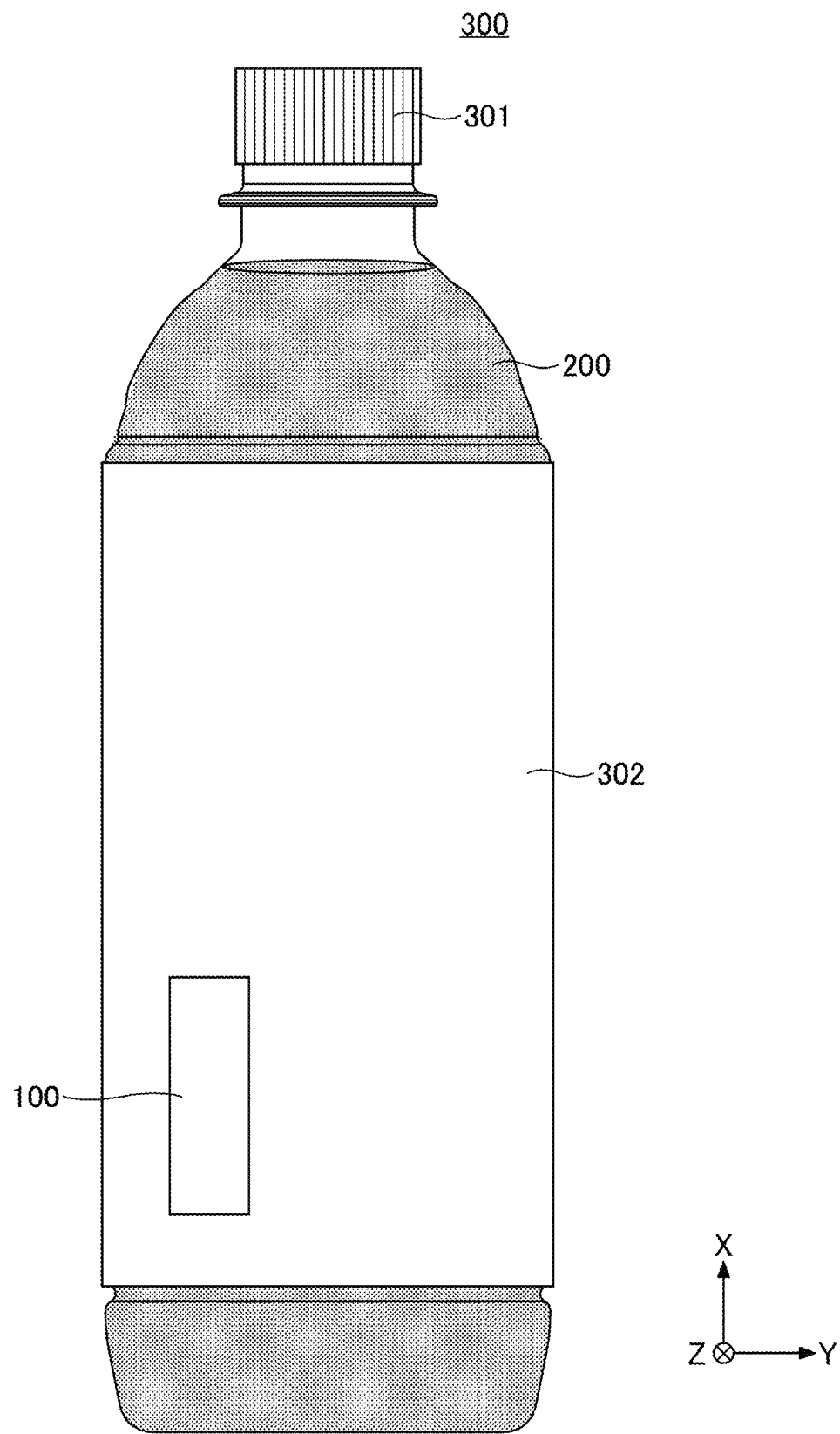
FIG. 1 is a perspective view of a container 300 that contains a liquid and is provided with a RFID tag according to an embodiment of the present invention.

Embodiments of the present invention will be described in detail with reference to the drawings. In the following description and the drawings, the same elements are denoted by the same reference numerals, and the description thereof will not be repeated. In order to facilitate understanding of the description, the constituent elements illustrated in the drawings may not be to scale. In the embodiments, deviations from directions such as a parallel direction, an orthogonal direction, a horizontal direction, a vertical direction, an up-down direction, a left-right direction, and the like are tolerated as long as the effects of the present invention are not impaired. Further, an X-axis direction, a Y-axis direction, and a Z-axis direction respectively represent a direction parallel to an X-axis, a direction parallel to a Y-axis, and a direction parallel to a Z-axis. The X-axis direction, the Y-axis direction, and the Z-axis direction are orthogonal to each another. An XY-plane, a YZ-plane, and a ZX-plane respectively represent a virtual plane parallel to both the X-axis direction and the Y-axis direction, a virtual plane parallel to both the Y-axis direction and the Z-axis direction, and a virtual plane parallel to both the Z-axis direction and the X-axis direction. In the drawings, a direction indicated by the arrow representing the X-axis is referred to as a positive X-axis direction, and a direction opposite to the positive X-axis direction is referred to as a negative X-axis direction. Further, a direction indicated by the arrow representing the Y-axis is referred to as a positive Y-axis direction, and a direction opposite to the positive Y-axis direction is referred to as a negative Y-axis direction. Further, a direction indicated by the arrow representing the Z-axis is referred to as a positive Z-axis direction, and a direction opposite the positive Z-axis direction is referred to as a negative Z-axis direction. The X-axis direction corresponds to a height direction when a container, which will be described later, is viewed from the side. The Y-axis direction corresponds to a width direction when the container, which will be described later, is viewed from the side. The Z-axis direction corresponds to a depth direction when the container, which will be described later, is viewed from the side.

FIG. 1 is a perspective view of a container 300 that contains a liquid 200 and is provided with a RFID tag 100 according to an embodiment of the present invention. The container 300 illustrated in FIG. 1 is a bottle made of polyethylene terephthalate (a PET bottle) that contains the liquid 200. The liquid 200 may be any water-like liquid such as a beverage or mineral water. However, the liquid 200 is not limited thereto, and may be oil, alcohol, or the like. The liquid 200 may be a mixture of any of water, oil, and alcohol (for example, a mixture of water and ethanol). A cap 301 is provided at the tip portion on the positive X-side of the container 300. The outer peripheral surface of the container 300 is covered by a transparent strip-shaped label 302. The label 302 has the RFID tag 100. The RFID tag 100 is present in the air (ambient air). That is, the atmosphere of the container 300 provided with the RFID tag 100 is the air.

Note that the container 300 may be any container that can contain the liquid 200. For example, the container 300 may be a container made from glass, a sealed container such as Tupperware (registered trademark), or the like. In the following, for simplicity of description, the liquid 200 may be simply referred to as a "liquid", and the container 300 may be simply referred to as a "container". Further, the RFID tag 100 is provided with a dipole antenna. Thus, the RFID tag 100 is attached to the container 300 such that the RFID tag 100 is vertically elongated; however, the RFID tag 100 may be attached to the container 300 in any other manner.

Next, an example configuration of the RFID tag 100 will be described with reference to FIG. 2. FIG. 2 is a diagram illustrating an example configuration of the RFID tag 100. The RFID tag 100 includes a strip-shaped sheet 40, an IC chip 10 that stores identification information, a loop conductor 20, and an antenna unit 30.

The sheet 40 is a film having a strip shape and formed by laminating a plurality of synthetic resin films, such as polyethylene terephthalate films or polypropylene films. For example, the IC chip 10, the loop conductor 20, and the antenna unit 30 may be sandwiched between the plurality of synthetic resin films. Note that the IC chip 10, the loop conductor 20, and the antenna unit 30 may be directly provided on the container, or may be provided on the label 302 of the container.

The IC chip 10 has an internal capacitance, and a matching circuit is composed of the inductance of the antenna unit 30 and the internal capacitance of the IC chip 10.

The loop conductor 20 is a loop (annular) conductive wiring pattern of one turn or less in plan view when the sheet 40 is viewed in the Z-axis direction.

The loop conductor 20 is electrically connected to the IC chip 10 and the antenna unit 30. Identification information stored in the IC chip 10 is read by a reader as follows. When the antenna unit 30 receives radio waves in the ultra high frequency (UHF) band such as radio waves at a frequency of about 920 MHz, a current flows through the loop conductor 20 due to resonant action, thereby generating an electromotive force that operates the IC chip 10. When the IC chip 10 operates, the identification information stored in the IC chip 10 is encoded by the IC chip 10, and the encoded data is wirelessly transmitted to a communication device such as a reader using a radio wave of about 920 MHz as a carrier wave. The reader receives this signal, decodes the signal, and transfers the decoded signal to an external device. The RFID tag 100 according to the present embodiment is a passive wireless tag of a radio wave type that does not have a power source (battery) for retaining and transmitting identification information. Accordingly, as compared to an active wireless tag with a battery, the RFID tag 100 without a battery can be reduced in size and cost.

The antenna unit 30 is a dipole antenna configured to show resonant characteristics between the antenna unit 30 and the IC chip 10 at frequencies of radio waves for wireless communication (e.g., frequencies in the UHF band). The antenna unit 30 as a whole has an electrical length of approximately λ/2 (λ is the communication wavelength).

The antenna unit 30 has a structure that achieves conjugate impedance matching with the IC chip 10, for example, for radio waves at frequencies of approximately 920 MHz (e.g., 860 MHz to 960 MHz, more preferably 915 MHz to 935 MHz), even when the container 300 is filled with a liquid and the liquid is present in the vicinity of the antenna unit 30. The antenna unit 30 includes two conductors (conductor units 30A and 30B) as a structure that achieves conjugate impedance matching with the IC chip 10. The conductor unit 30A and the conductor unit 30B are conductive wiring patterns connected to the loop conductor 20 and extending away from each other from the loop conductor 20. The conductive wiring patterns can be formed by any existing method, such as pressing or etching of copper foil or aluminum foil, plating, or screen printing of metal paste, or can be formed of a metal wire. In this example, the conductive wiring patterns are formed by etching aluminum.

The conductor unit 30A and the conductor unit 30B are line symmetrical with respect to a virtual line VL passing substantially through the center of the IC chip 10. The virtual line VL is a line parallel to the XY plane and extending in the Y-axis direction. The virtual line VL is also a line that substantially bisects the RFID tag 100 in the X-axis direction.

Each of the conductor unit 30A and the conductor unit 30B has an electrical length of approximately λ/4 (λ is the communication wavelength). The impedance matching condition of the antenna unit 30 is satisfied if the impedance of the source is the complex conjugate of the impedance of the load. Therefore, if the source impedance Zs=Rs+jXs, maximum power transfer is obtained when the load impedance Zl=Rs−jXs.

The conductor units 30A and 30B are line symmetrical respect to the virtual line VL. Therefore, in the following, the configuration of the conductor unit 30A will be described. The conductor unit 30B extends in a direction opposite to a direction (negative X-axis direction) in which the conductor unit 30A extends. The other aspects of the conductor unit 30B are the same as those of the conductor unit 30A, and thus, the description of the conductor unit 30B is not repeated.

The conductor unit 30A includes a first element 1, a second element 2, a third element 3, and fourth elements 4.

The first element 1 is a conductive wiring pattern having a meandering shape and extends from the loop conductor 20 in the negative x-axis direction. The first element 1 is a meandering element.

The end portion on the positive X-axis side of the first element 1 is connected to the loop conductor 20. For example, the first element 1 is connected to a peripheral portion (connecting point) on the positive Y-axis side of the loop conductor 20. The first element 1 extends from the connecting point between the first element and the loop conductor 20 to a predetermined point in the negative X-axis direction at a predetermined angle (for example, 30 degrees to 60 degrees), and extends further from the predetermined point in the negative X-axis direction. Note that the shape of the first element 1 is not limited to the shape illustrated in FIG. 2. For example, the first element 1 may be shaped to extend from the connecting point between the first element 1 and the loop conductor 20 to a predetermined point in the positive Y-axis direction, is bent vertically from the predetermined point, and extends in the negative X-axis direction.

Because the first element 1 is connected to the peripheral portion on the positive Y-axis of the loop conductor 20, the length in the X-axis direction of the antenna unit 30 can be reduced. Therefore, the RFID tag 100 having a small ratio of the vertical length to the horizontal length can be provided. Accordingly, even when the RFID tag 100 is attached to a small PET bottle having a relatively small height in the X-axis direction and thus having a small label, the RFID tag 100 can be positioned so as not to visually obstruct product information displayed on the label.

The connecting point between the first element 1 and the loop conductor 20 is not limited to the above, and the first element 1 may be connected to a peripheral portion on the negative X-axis side of the loop conductor 20. With this configuration, the first element 1 can be provided in an area on the negative X-axis side of the loop conductor 20. Therefore, the length in the Y-axis direction of the antenna unit 30 can be reduced, thereby allowing the RFID tag 100 to have an elongated shape. Accordingly, even when the RFID tag 100 is attached to a large PET bottle having a relatively large height in the X-axis direction, the RFID tag 100 can be positioned so as not to visually obstruct product information displayed on the label.

The second element 2 is a conductive wiring pattern having a linear shape and extending from the loop conductor 20 in the negative X-axis direction. The second element 2 is a linear element.

The end portion on the positive X-axis side of the second element 2 is connected to the first element 1 or is connected to the loop conductor 20.

If the second element 2 is connected to the first element 1, the second element 2 is connected to, for example, the vicinity of the connecting point between the first element 1 and the loop conductor 20. The second element 2 extends a certain distance from the connecting point between the second element 2 and the first element 1 in the negative X-axis direction.

If the second element 2 is connected to the loop conductor 20, the second element 2 is connected to, for example, a peripheral portion on the positive Y-axis of the loop conductor 20.

The second element 2 may be provided on the negative Y-axis side of the first element 1, or may be provided on the positive Y-axis side of the first element 1.

As illustrated in FIG. 2, if the second element 2 is provided on the negative Y-axis side of the first element 1, an area on the negative X-axis side of the loop conductor 20 can be effectively utilized. Therefore, the RFID tag 100 having a small ratio of the vertical length to the horizontal length can be provided.

A gap (separation distance in the Y-axis direction) between the second element 2 and the first element 1 is preferably set to a value from 0.5 mm to 2.0 mm such that the impedance of the antenna unit becomes the complex conjugate of the impedance of the IC chip. If the separation distance is excessively large, the real part of the impedance increases, thus making it difficult for the antenna to be the complex conjugate of the IC chip. The second element 2 serves as a primary element, and the first element 1 serves as a secondary element.

The third element 3 is a conductive wiring pattern having a hook shape and extending from the tip on the negative X-axis side of the second element 2 in a direction different from the extending direction of the second element 2. The third element 3 is a hook element. The third element 3 may be a U-shaped pattern or an L-shaped pattern.

Note that the second element 2 and the third element 3 may be integrally formed in a hook shape.

As illustrated in FIG. 2, the third element 3 extends a certain distance from the tip on the negative X-axis side of the second element 2 in the negative Y-axis direction, is bent vertically in the positive X-axis direction, and then extends a certain distance toward the loop conductor 20. With this configuration, the area on the negative X-axis side of the loop conductor 2 can be effectively utilized. Therefore, the RFID tag 100 having a small ratio of the vertical length to the horizontal length can be provided.

A gap is formed between a part, extending the certain distance toward the loop conductor 20, of the third element 3 and the second element 2. The gap (separation distance in the Y-axis direction) is preferably set to a value from 1.0 mm to 30.0 mm. The plurality of fourth elements 4 are provided in the gap.

The fourth elements 4 are conductive wiring patterns. The fourth elements 4 extend from the second element 2 to the third element 3, and the fourth elements 4, the second element 2, and the third element 3 together form a grid pattern. The fourth elements 4 are grid elements.

In the present embodiment, the three fourth elements 4 are used as an example. However, the present invention is not limited thereto, and one or more fourth elements 4 may be used. The distance between two adjacent fourth elements 4 may be set to a value from 1.0 mm to 30.0 mm so as to broaden the communication frequency range and also increase the communication distance.

The electrical length of each of the elements is set as follows.

For example, the first element 1 is set to have an electrical length that is a multiple of $\lambda/4$, where $\lambda$ is the wavelength of a frequency used. In this case, at least one of the electrical length of the second element 2 and the electrical length of the third element 3 is set to be different from the electrical length that is a multiple of $\lambda/4$. In this case, the different electrical length ranges from, for example, $\lambda/3.5$ to $\lambda/4.5$, where $\lambda$ is the wavelength of the frequency used.

Instead of the first element 1, the second element 2 may be set to have an electrical length that is a multiple of $\lambda/4$, where $\lambda$ is the wavelength of the frequency used. In this case, at least one of the electrical length of the first element 1 and the electrical length of the third element 3 is set to be different from the electrical length that is a multiple of $\lambda/4$, where $\lambda$ is the wavelength of the frequency used. In this case, the different electrical length ranges from, for example, $\lambda/3.5$ to $\lambda/4.5$, where $\lambda$ is the wavelength of the frequency used.

Further, instead of the first element 1, the sum of the electrical length of the second element 2 and the electrical length of the third element 3 having an L-shape (an inverse L-shape) may be set to a multiple of $\lambda/4$, where $\lambda$ is the wavelength of the frequency used. In this case, the electrical length of the first element 1 is set to be different from the electrical length that is a multiple of $\lambda/4$, where $\lambda$ is the wavelength of the frequency used. In this case, the different electrical length ranges from, for example, $\lambda/3.5$ to $\lambda/4.5$, where $\lambda$ is the wavelength of the frequency used.

Further, instead of the first element 1, the sum of the electrical length of the second element 2, the electrical length of the third element 3, and the electrical length of a fourth element 4 (any one of the three fourth elements 4, for example) may be set to a multiple of $\lambda/4$, where $\lambda$ is the wavelength of the frequency used. In this case, the electrical length of the first element 1 is set to be different from the electrical length that is a multiple of $\lambda/4$, where $\lambda$ is the wavelength of the frequency used. In this case, the different electrical length ranges from, for example, $\lambda/3.5$ to $\lambda/4.5$, where $\lambda$ is the wavelength of the frequency used.

Next, impedance characteristics of the RFID tag 100 will be described with reference to FIG. 3A and FIG. 3B.

Figure 3A:
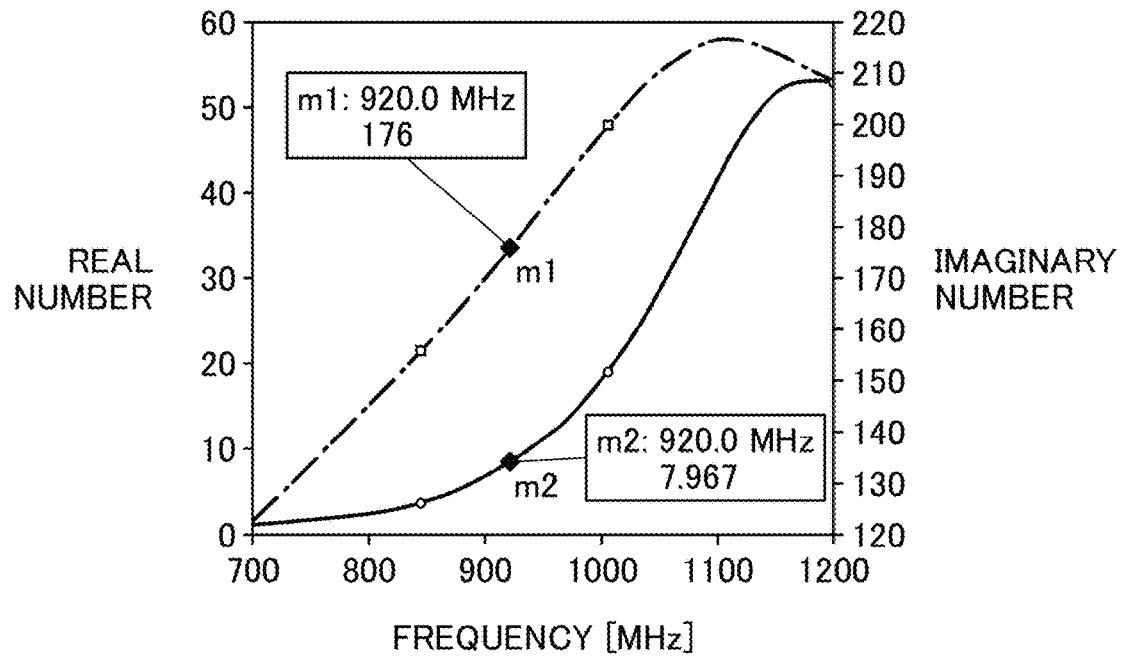
FIG. 3A is a diagram illustrating impedance characteristics of the RFID tag measured when no liquid is contained in a container.

FIG. 3A is a diagram illustrating impedance characteristics of the RFID tag 100 measured when no liquid 200 is contained in the container 300. FIG. 3B is a diagram illustrating impedance characteristics of the RFID tag 100 measured when a liquid 200 is contained in the container 300.

The impedance Zc of the RFID tag 100 is "$Zc=Rc+jXc$", where c is the abbreviation for the chip (IC chip 10). The vertical axis represents a real number and an imaginary number. The horizontal axis represents the frequency of a radio wave for wireless communication. The continuous line indicates a real number corresponding to each frequency. The dash-dot line indicates an imaginary number corresponding to each of the frequencies.

In FIG. 3A, a real number at 920 MHz is approximately 8Ω, and an imaginary number at 920 MHz is approximately 176Ω. In FIG. 3B, a real number at 920 MHz is approximately 21Ω, and an imaginary number at 920 MHz is approximately 198Ω. Accordingly, it can be seen that the impedance characteristics change depending on whether the liquid is contained in the container.

Figure 3B:
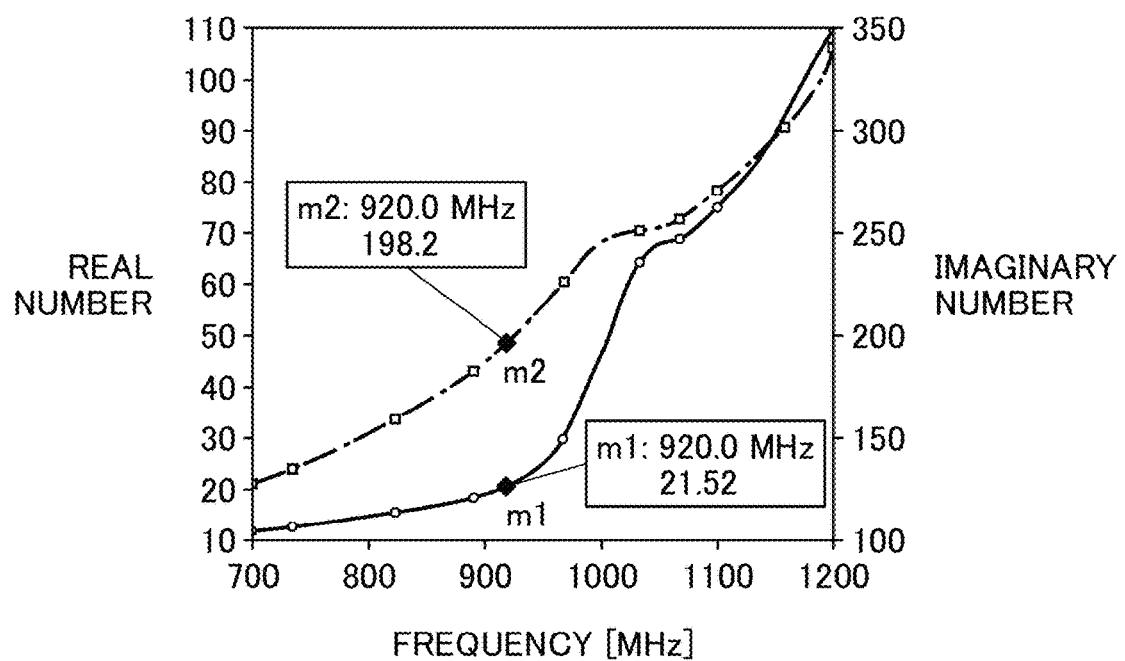
FIG. 3B is a diagram illustrating impedance characteristics of the RFID tag measured when a liquid is contained in the container.

The impedance characteristics illustrated in FIG. 3A and FIG. 3B are less disturbed as compared to impedance characteristics according to a comparative example as will be described later. As used herein, less disturbance of impedance characteristics means less degradation of the antenna performance. A RFID tag according to a comparative example of the present invention will be described with reference to FIG. 4.

FIG. 4 is a diagram illustrating an example configuration of a RFID tag 100A according to a comparative example. The RFID tag 100A according to the comparative example includes an element 31 that is a wiring pattern having a meandering shape, instead of the first element 1, the second element 2, and the third element 3.

The element 31 is a conductive wiring pattern having a rectangular shape, connected to the loop conductor 20, and extending from the loop conductor 20 in the X-axis direction. The element 31 is set to have an electrical length that is a multiple of approximately ¼ of the wavelength of the frequency used. Approximately ¼ of the wavelength of the frequency used includes approximately ⅓ to ⅕ of the wavelength of the frequency used.

The impedance characteristics of the RFID tag 100A according to the comparative example having the above configuration will be described with reference to FIG. 5A and FIG. 5B.

Figure 5A:
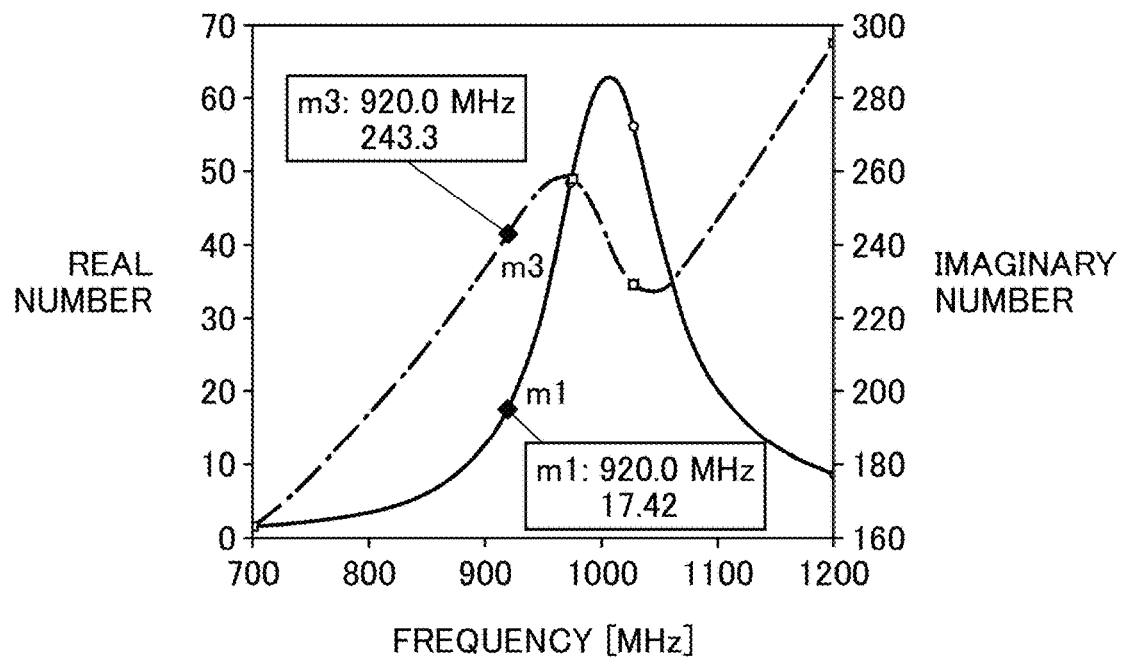
FIG. 5A is a diagram illustrating impedance characteristics of a RFID tag according to a comparative example measured when no liquid is contained in the container.

FIG. 5A is a diagram illustrating impedance characteristics of the RFID tag 100A according to the comparative example measured when no liquid 200 is contained in the container 300. FIG. 5B is a diagram illustrating impedance characteristics of the RFID tag 100A according to the comparative example measured when a liquid 200 is contained in the container 300. Similar to FIG. 3A and FIG. 3B, the vertical axis represents a real number and an imaginary number. The horizontal axis represents the frequency of a radio wave for wireless communication. The continuous line indicates a real number corresponding to each frequency. The dash-dot line indicates a real number corresponding to each of the frequencies.

In FIG. 5A, a real number at 920 MHz is approximately 17Ω, and an imaginary number at 920 MHz is approximately 243Ω. In FIG. 5B, a real number at 920 MHz is approximately 80Ω, and an imaginary number at 920 MHz is approximately 25Ω.

Figure 5B:
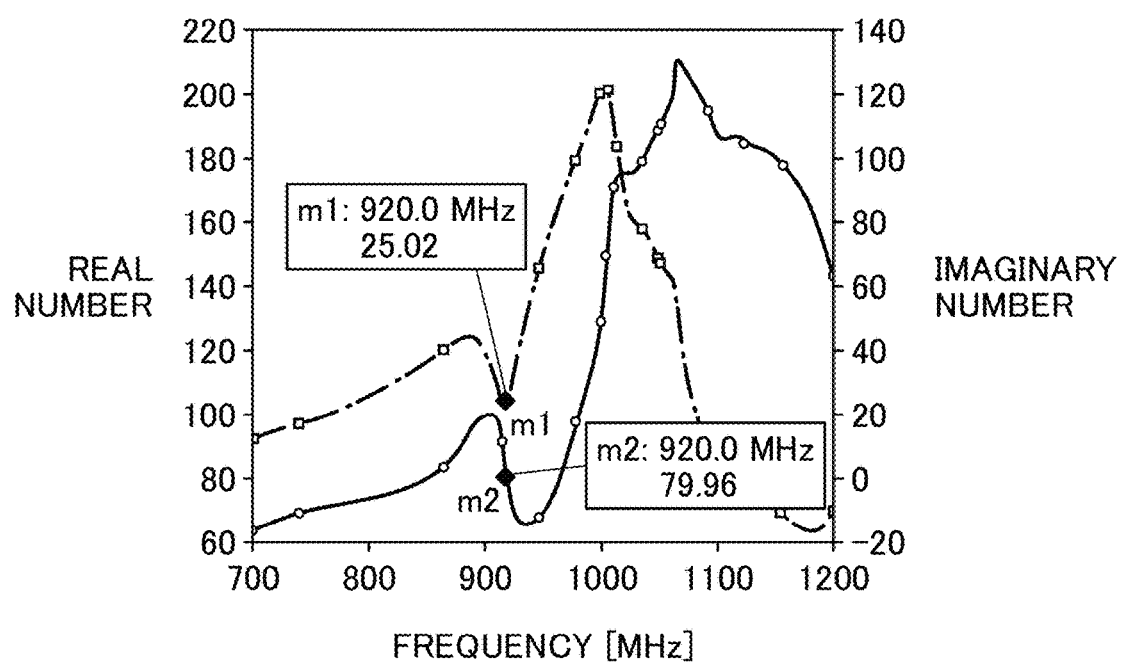
FIG. 5B is a diagram illustrating impedance characteristics of the RFID tag according to the comparative example measured when a liquid is contained in the container.

As compared to the impedance characteristics illustrated in FIG. 3A and FIG. 3B, it can be seen that the impedance characteristics illustrated in FIG. 5A and FIG. 5B are greatly disturbed. It is considered that the impedance characteristics are greatly disturbed due to electrical coupling between the element 31 having a meandering shape and the liquid having a dielectric constant ε of "80". For example, if the element 31 is located in front of the liquid when viewed from the reader, that is, the reader, the element 31, and the liquid are arranged in this order, the impedance of the RFID tag 100A according to the comparative example would be affected and greatly changed by the dielectric constant of the liquid. That is, in order to secure an electrical length required for wireless communication of an antenna unit 30, the RFID tag 100A according to the comparative example employs the antenna element having a meandering shape. Therefore, it is assumed that electrical coupling between the antenna element and the liquid located behind the element 31 when viewed from the reader increases, thereby causing the impedance characteristics to be greatly disturbed. Therefore, measures are conventionally taken, such as decreasing the distance between the antenna element and the container by disposing a spacer between the antenna element and the container so as to reduce electrical coupling, or inserting a metal sheet between the antenna element and the container so as to reduce electrical coupling.

It is also known that radio waves of relatively high frequencies in the UHF band are easily absorbed by a liquid. For example, if a liquid is present between the reader and the element 31, part of a radio wave transmitted from the reader is absorbed by the liquid in the container, and the remaining weak radio wave is received by the element 31. That is, the strength of the radio wave received by the element 31 would decrease. Because the element 31 uses the radio wave as a carrier wave to transmit a signal related to identification information to the reader, the weak radio wave transmitted from the RFID tag 100A according to the comparative example would be absorbed by the liquid in the container, thus causing the strength of the radio wave received by the reader to decrease.

Further, if a liquid is present between the reader and the element 31, it is known that the wavelength of a radio wave is slightly shortened (an effect of shortening the wavelength) when the radio wave passes through the liquid. If the wavelength of the radio wave is shortened, resonance conditions between the antenna unit 30 and the IC chip 10 would not be met. Therefore, the conjugate matching condition would not be satisfied, and maximum power transfer would not be obtained.

In the RFID tag 100A according to the comparative example, the element 31 having a meandering shape is employed, and further, the electrical length of the element 31 is set to be a multiple of λ/4, where λ is the wavelength of the frequency used. Therefore, the inventors have found that wireless communication with the reader may be made difficult due to the above-described electrical coupling, the effect of shortening the wavelength, the absorption and attenuation of radio waves, and the like.

Conversely, in the RFID tag 100 according to the present embodiment, an antenna element having a shape other than at least a meandering shape is employed. Accordingly, electrical coupling between the antenna element and the liquid can be reduced. Further, in the RFID tag 100 according to the present embodiment, a plurality of antenna elements having different shapes are combined. Accordingly, electrical coupling between the antenna elements and the liquid can be reduced.

Further, in the RFID tag 100 according to the present embodiment, a plurality of elements having different electrical lengths are combined, thus allowing deviations from the resonance conditions to be corrected. Accordingly, a matching circuit that is robust to the effect of shortening the wavelength can be obtained.

Further, in the RFID tag 100 according to the present embodiment, the plurality of antenna elements having different shapes are combined or the plurality of elements having different electrical lengths are combined. Accordingly, the strength of a radio wave received by the antenna unit 30 can be increased.

Further, the RFID tag 100 according to the present embodiment may have configurations as described below. In the following, the same elements as those of the RFID tag 100 according to the above-described embodiment are denoted by the same reference numerals, and the description thereof will not be repeated. Elements different from those of the RFID tag 100 will be described.

FIG. 6 is an example configuration of a RFID tag 100-1 according to a first modification. In the RFID tag 100-1, the distance between the first element 1 and the second element 2 in the Y-axis direction is increased. In the RFID tag 100-1, the distance between the first element 1 and the second element 2 is preferably set to a value from 2.0 mm to 5.0 mm, such that the impedance of the antenna becomes the complex conjugate of the impedance of the IC chip. If the distance between the first element 1 and the second element 2 exceeds 5.0 mm, the resistance of the antenna would be increased and the communication distance would be reduced.

Figure 7A:
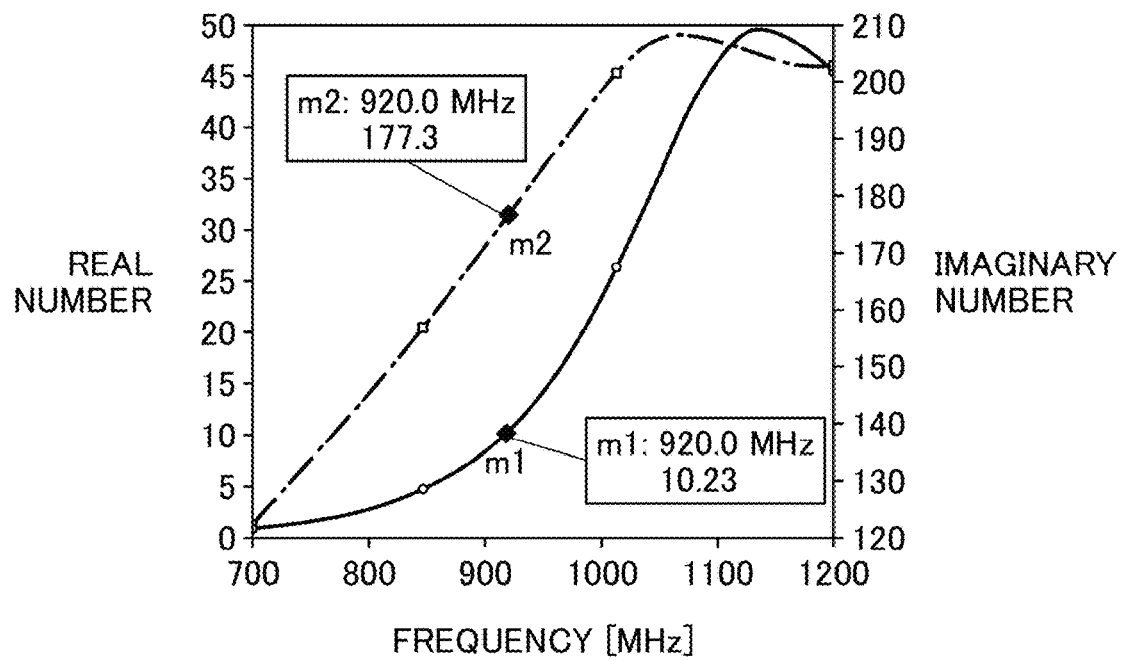
FIG. 7A is a diagram illustrating impedance characteristics of the RFID tag measured when no liquid is contained in the container.
Figure 7B:
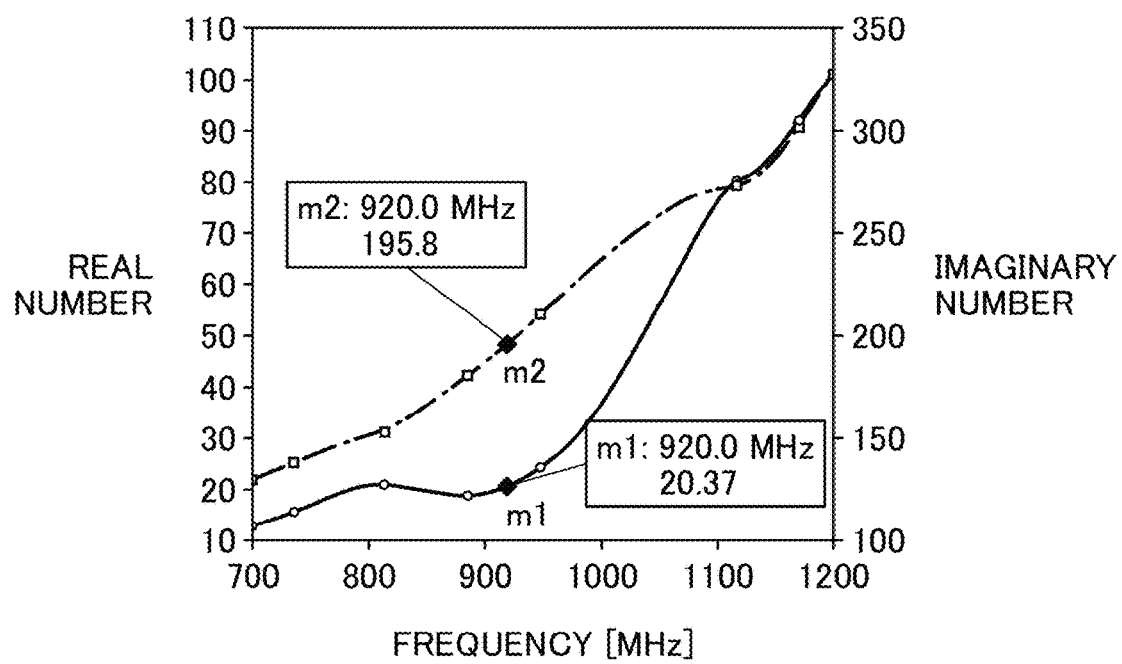
FIG. 7B is a diagram illustrating impedance characteristics of the RFID tag measured when a liquid is contained in the container.

FIG. 7A is a diagram illustrating impedance characteristics of the RFID tag 100-1 measured when no liquid 200 is contained in the container 300. FIG. 7B is a diagram illustrating impedance characteristics of the RFID tag 100-1 measured when a liquid 200 is contained in the container 300.

In FIG. 7A, a real number at 920 MHz is approximately 10Ω, and an imaginary number at 920 MHz is approximately 177Ω. In FIG. 7B, a real number at 920 MHz is approximately 23Ω, and an imaginary number at 920 MHz is approximately 196Ω. Accordingly, it can be seen that the impedance characteristics of the RFID tag 100-1 illustrated in FIG. 7A and FIG. 7B are less disturbed as compared to those of the above-described RFID tag 100A according to the comparative example.

Further, according to the RFID tag 100-1, effects similar to those of the RFID tag 100 can be obtained. Further, according to the RFID tag 100-1, for example, even if the vertical width of the first element 1 having a meandering shape is not uniform due to manufacturing tolerances, the increased distance between the first element 1 and the second element 2 can prevent contact between the first element 1 and the second element 2. Accordingly, the control of manufacturing tolerances of the first element 1 and the like is not required. Further, the increased distance between the first element 1 and the second element 2 allows each wiring pattern to be readily manufactured. As a result, the manufacturing yield of the RFID tag 100-1 can be improved, and the manufacturing cost can be reduced.

FIG. 8 is an example configuration of a RFID tag 100-2 according to a second modification. As compared to the RFID tag 100, the RFID tag 100-2 does not include the first element 1. The electrical length of each element is set as follows.

For example, the second element 2 is set to have an electrical length that is a multiple of $\lambda/4$, where $\lambda$ is the wavelength of the frequency used. In this case, the electrical length of the third element 3 is set to be different from the electrical length that is a multiple of $\lambda/4$. The different electrical length ranges from, for example, $\lambda/3.5$ to $\lambda/4.5$, where $\lambda$ is the wavelength of the frequency used.

Instead of the second element 2, the third element 3 may be set to have an electrical length that is a multiple of $\lambda/4$, where $\lambda$ is the wavelength of the frequency used. In this case, the electrical length of the second element 2 is set to be different from the electrical length that is a multiple of $\lambda/4$. The different electrical length ranges from, for example, $\lambda/3.5$ to $\lambda/4.5$, where $\lambda$ is the wavelength of the frequency used.

Further, instead of the second element 2, the sum of the electrical length of the third element 3 and the electrical length of a fourth element 4 (one of the three fourth elements 4, for example) may be set to a multiple of $\lambda/4$, where $\lambda$ is the wavelength of the frequency used. In this case, the electrical length of the second element 2 is set to be different from the electrical length that is a multiple of $\lambda/4$, where $\lambda$ is the wavelength of the frequency used. In this case, the different electrical length ranges from, for example, $\lambda/3.5$ to $\lambda/4.5$, where $\lambda$ is the wavelength of the frequency used.

Figure 9A:
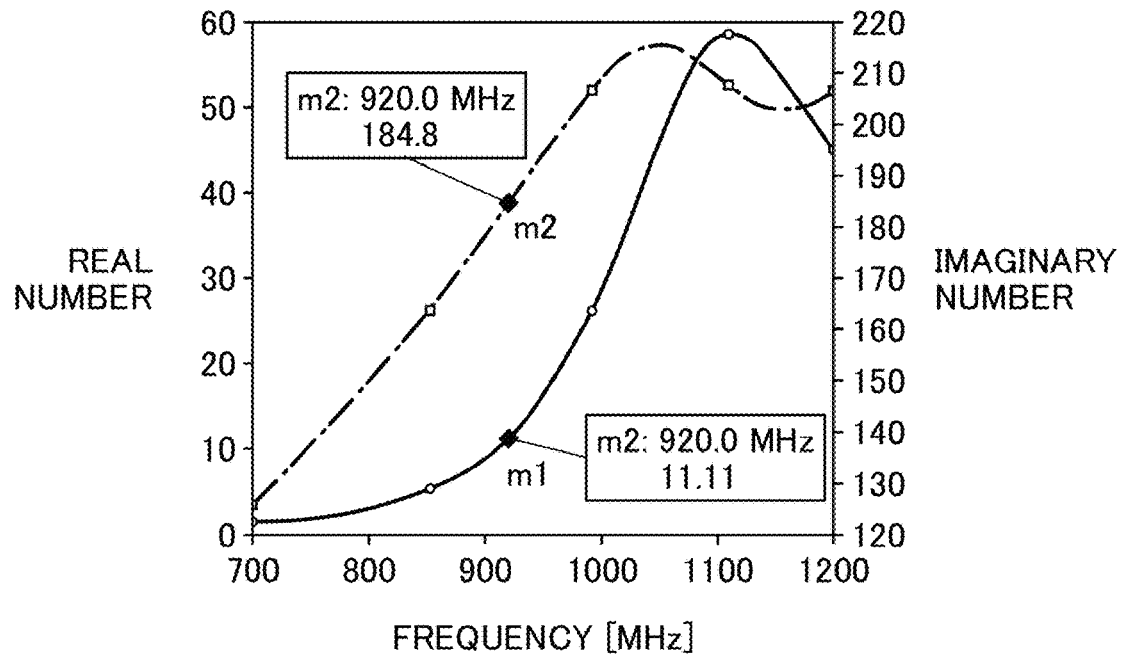
FIG. 9A is a diagram illustrating impedance characteristics of the RFID tag measured when no liquid is contained in the container.
Figure 9B:
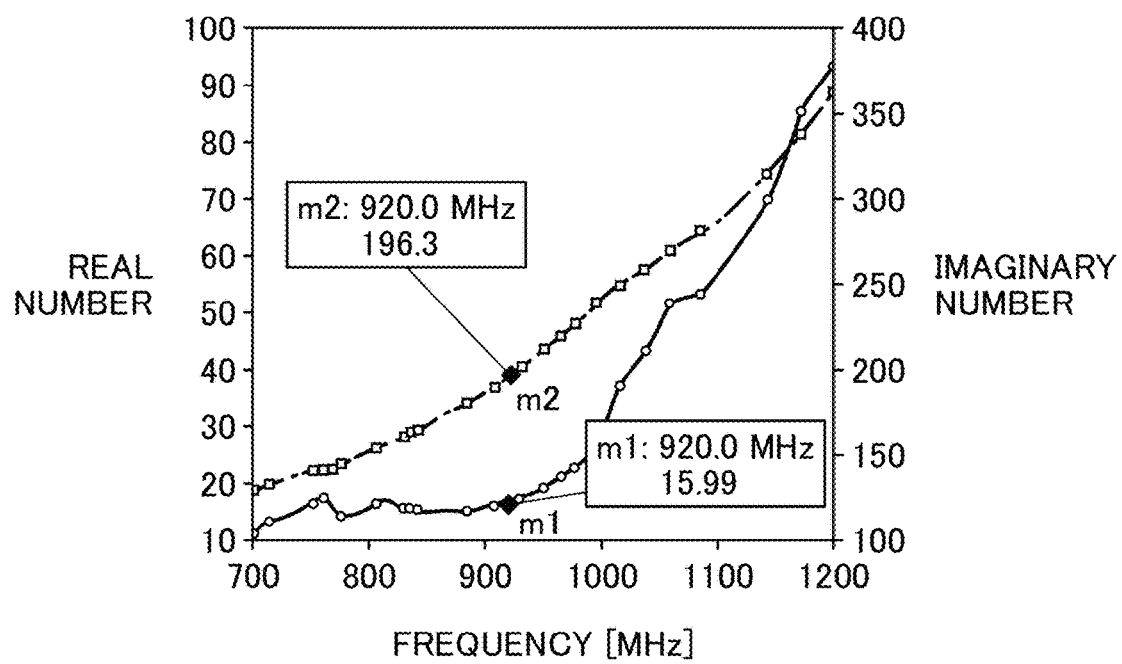
FIG. 9B is a diagram illustrating impedance characteristics of the RFID tag measured when a liquid is contained in the container.

FIG. 9A is a diagram illustrating impedance characteristics of the RFID tag 100-2 measured when no liquid 200 is contained in the container 300. FIG. 9B is a diagram illustrating impedance characteristics of the RFID tag 100-2 measured when a liquid 200 is contained in the container 300.

In FIG. 9A, a real number at 920 MHz is approximately 11Ω, and an imaginary number at 920 MHz is approximately 185Ω. In FIG. 9B, a real number at 920 MHz is approximately 16Ω, and an imaginary number at 920 MHz is approximately 196Ω. Accordingly, it can be seen that the impedance characteristics of the RFID tag 100-2 illustrated in FIG. 9A and FIG. 9B are less disturbed as compared to those of the above-described RFID tag 100A according to the comparative example.

Accordingly, the RFID tag 100-2 can obtain effects similar to those of the RFID tag 100 by combining a plurality of elements having both different electrical lengths and different shapes.

Further, because the RFID tag 100-2 does not include the first element 1, the control of manufacturing tolerances of the first element 1 and the like is not required, and also the structure of the RFID tag 100-2 can be simplified. As a result, the manufacturing yield of the RFID tag 100-2 can be improved, and the manufacturing cost can be further reduced.

Figure 10:
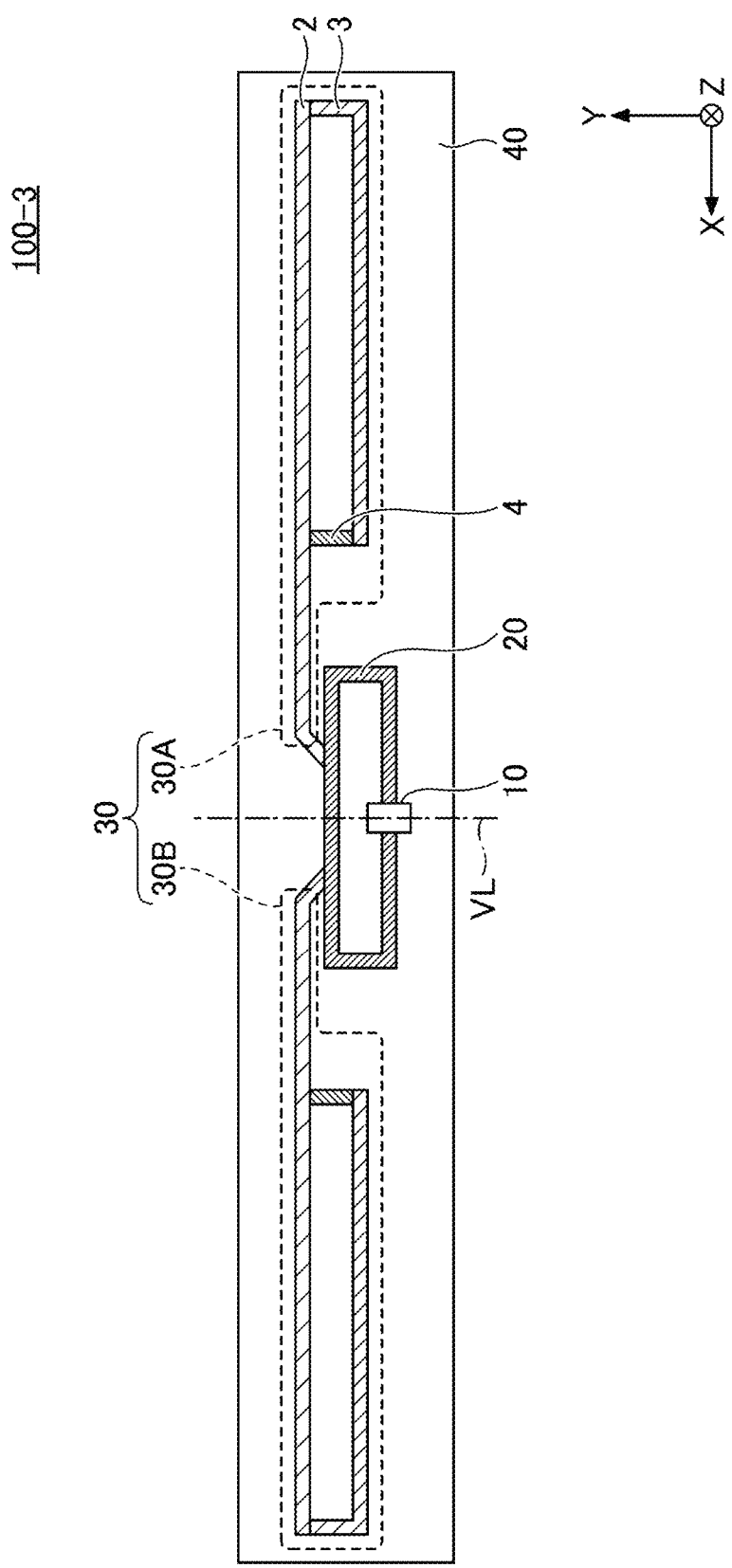
FIG. 10 is a diagram illustrating example configuration of a RFID tag according to a third modification.

FIG. 10 is an example configuration of a RFID tag 100-3 according to a third modification. As compared to the RFID tag 100-2, the RFID tag 100-3 includes a fewer number of fourth elements 4.

Figure 11A:
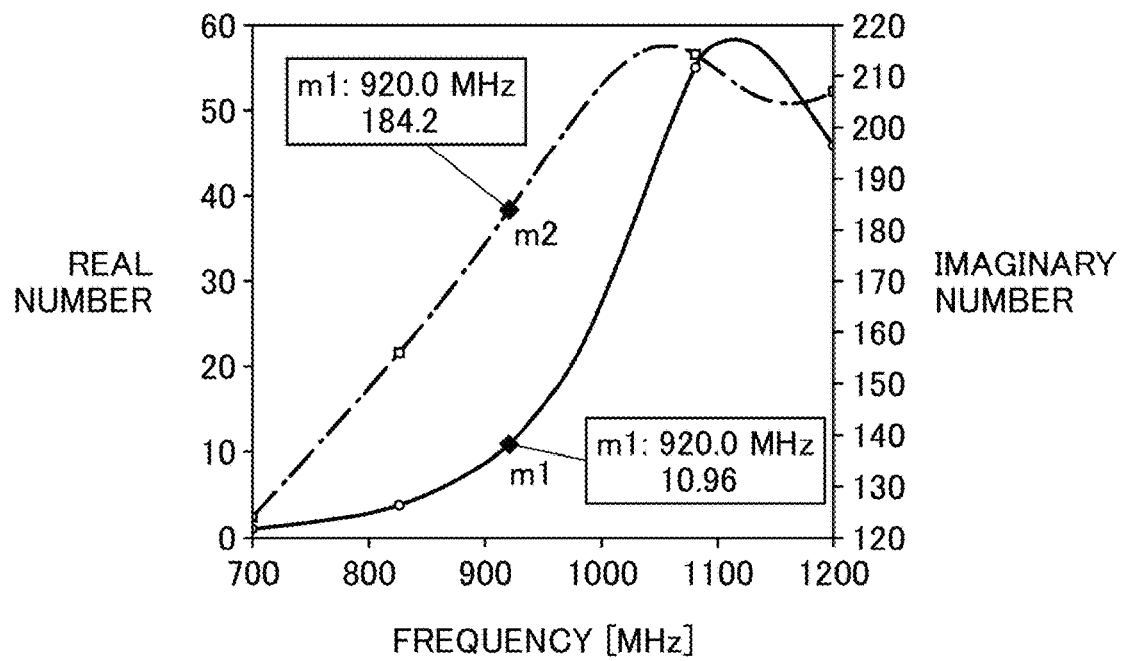
FIG. 11A is a diagram illustrating impedance characteristics of the RFID tag measured when no liquid is contained in the container.
Figure 11B:
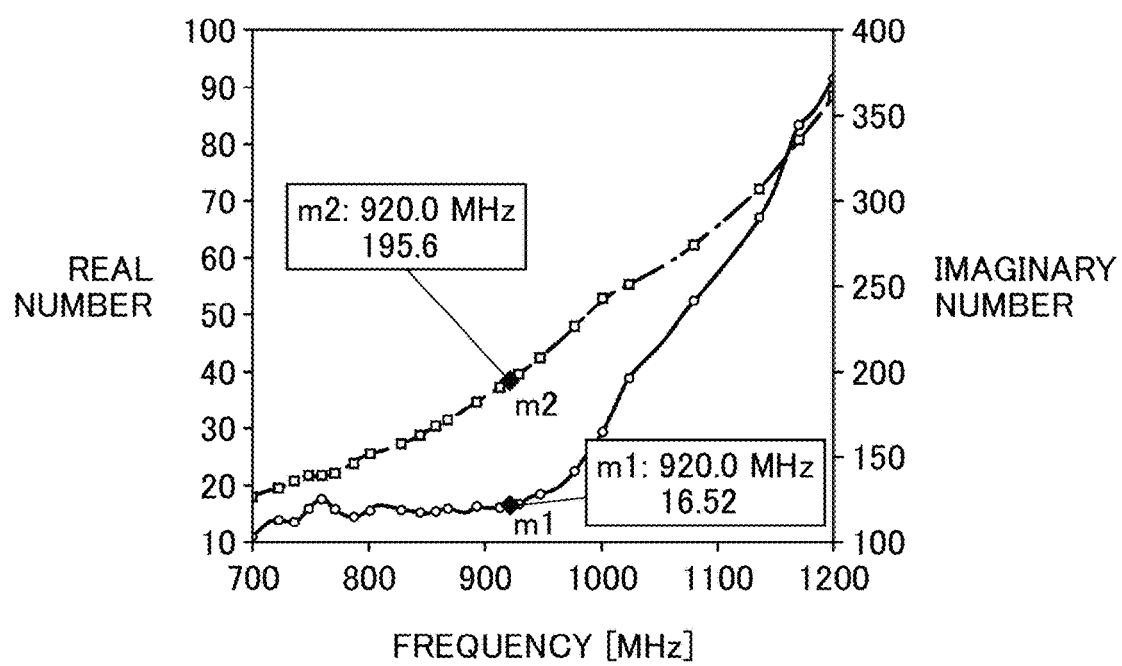
FIG. 11B is a diagram illustrating impedance characteristics of the RFID tag measured when a liquid is contained in the container.

FIG. 11A is a diagram illustrating impedance characteristics of the RFID tag 100-3 measured when no liquid 200 is contained in the container 300. FIG. 11B is a diagram illustrating impedance characteristics of the RFID tag 100-3 measured when a liquid 200 is contained in the container 300.

In FIG. 11A, a real number at 920 MHz is approximately 11Ω, and an imaginary number at 920 MHz is approximately 184Ω. In FIG. 11B, a real number at 920 MHz is approximately 17Ω, and an imaginary number at 920 MHz is approximately 196Ω. Accordingly, it can be seen that the impedance characteristics of the RFID tag 100-3 illustrated in FIG. 11A and FIG. 11B are less disturbed as compared to the impedance characteristics of the above-described RFID tag 100A according to the comparative example. Further, it can be seen that the impedance characteristics of the RFID tag 100-3 illustrated in FIG. 11A and FIG. 11B are not greatly disturbed as compared to the impedance characteristics of the RFID tag 100-2 according to the second modification.

Accordingly, the RFID tag 100-3 can obtain effects similar to those of the RFID tag 100 by combining a plurality of elements having both different electrical lengths and different shapes.

Further, because the RFID tag 100-3 includes the fewer number of fourth elements 4, the control of manufacturing tolerances of the fourth elements 4 and the like is less required, and also the structure of the RFID tag 100-3 can be simplified. As a result, the manufacturing yield of the RFID tag 100-3 can be improved, and the manufacturing cost can be further reduced.

Figure 12:
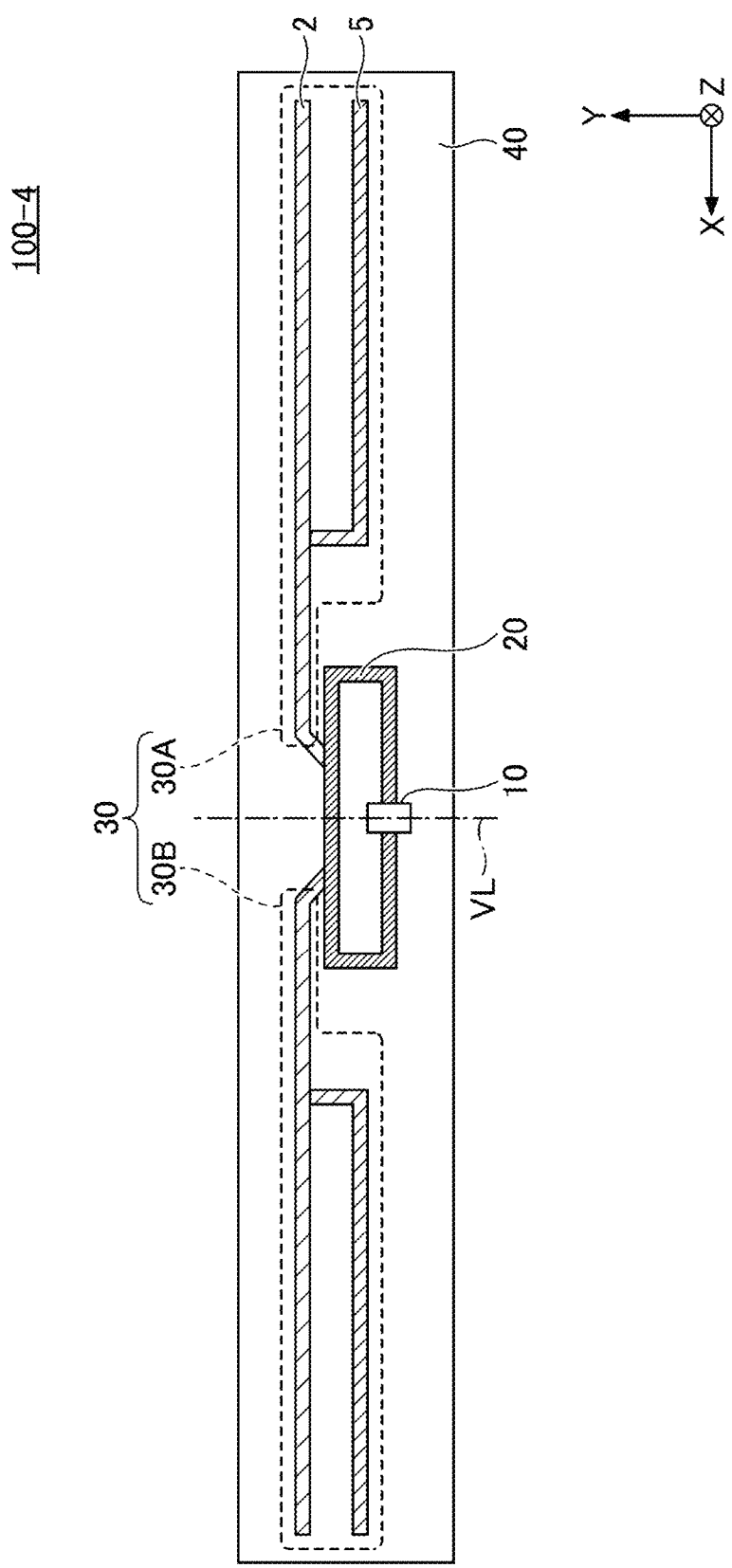
FIG. 12 is a diagram illustrating example configuration of a RFID tag according to a fourth modification.

FIG. 12 is an example configuration of a RFID tag 100-4 according to a fourth modification. As compared to the RFID tag 100-3, the RFID tag 100-4 includes a fifth element 5, and does not include the third element 3 and the fourth elements 4. The second element 2 is a primary element, and the fifth element 5 is a secondary element.

The fifth element 5 is a conductor that is connected to the second element 2, which is a linear element, so as to branch from an intermediate portion of the second element 2, and that extends in parallel to the second element 2. The fifth element 5 is a branch element.

A connecting point between the fifth element 5 and the second element 2 is located a predetermined distance away from a connecting point between the second element 2 and the loop conductor 20. The predetermined distance may be preferably set to a value from 5.0 mm to 100.0 mm, such that the resistance of the antenna does not excessively increase.

A gap is formed between the second element 2 and a part, extending in a direction opposite to the loop conductor 20, of the fifth element 5. The gap (separation distance in the Y-axis direction) may be preferably set to a value from 1.0 mm to 30.0 mm, such that the resistance of the antenna does not excessively increase. Note that the fourth elements 4 as described above may be provided between the gap.

The electrical length of each element is set as follows.

For example, the second element 2 is set to have an electrical length that is a multiple of $\lambda/4$, where $\lambda$ is the wavelength of the frequency used. In this case, the electrical length of the fifth element 5 is set to be different from the electrical length that is a multiple of $\lambda/4$. The different electrical length ranges from, for example, $\lambda/3.5$ to $\lambda/4.5$, where $\lambda$ is the wavelength of the frequency used.

Instead of the second element 2, the fifth element 5 may be set to have an electrical length that is a multiple of $\lambda/4$, where $\lambda$ is the wavelength of the frequency used. In this case, the electrical length of the second element 2 is set to be different from the electrical length that is a multiple of λ/4. The different electrical length ranges from, for example, λ/3.5 to λ/4.5, where λ is the wavelength of the frequency used.

Figure 13A:
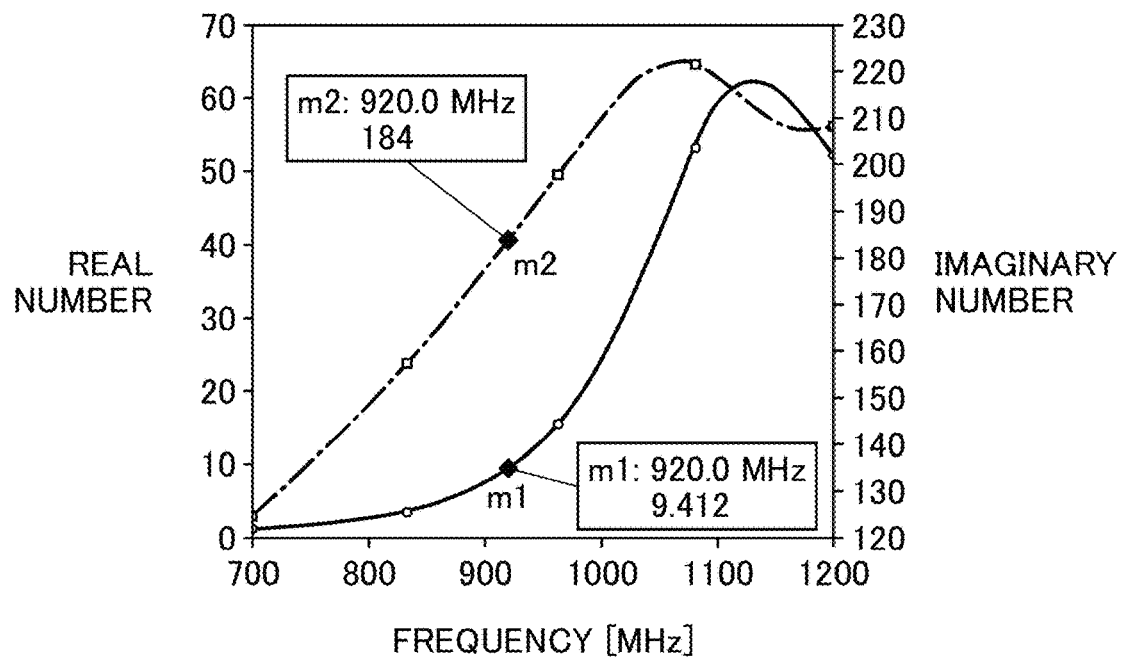
FIG. 13A is a diagram illustrating impedance characteristics of the RFID tag measured when no liquid is contained in the container.
Figure 13B:
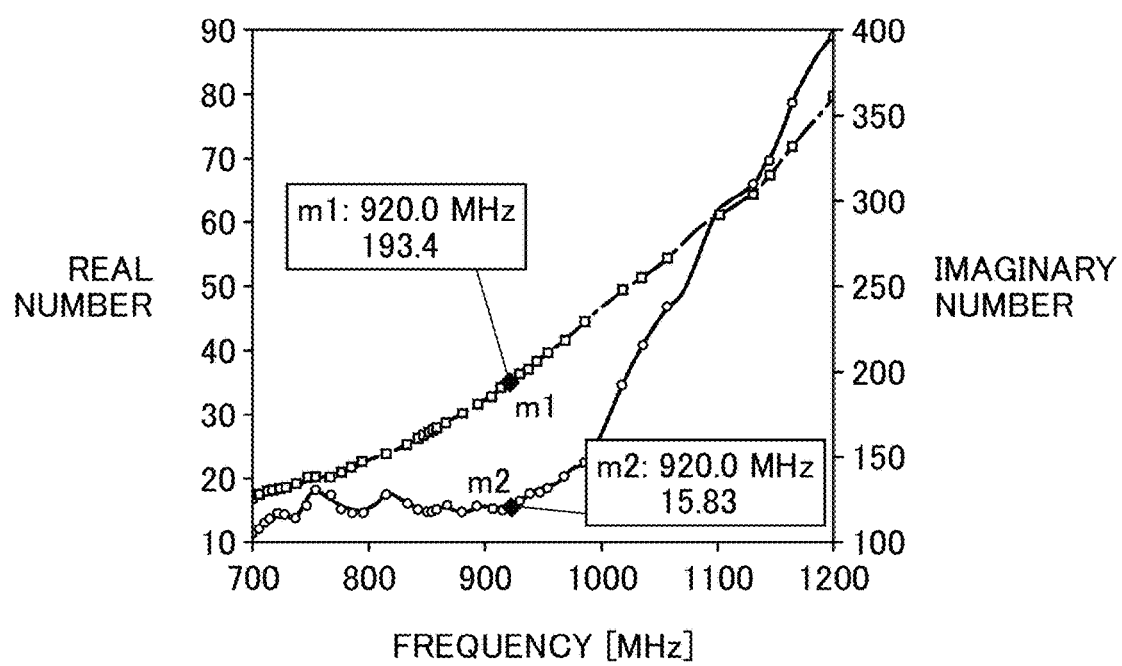
FIG. 13B is a diagram illustrating impedance characteristics of the RFID tag measured when a liquid is contained in the container.

FIG. 13A is a diagram illustrating impedance characteristics of the RFID tag 100-4 measured when no liquid 200 is contained in the container 300. FIG. 13B is a diagram illustrating impedance characteristics of the RFID tag 100-4 measured when a liquid 200 is contained in the container 300.

In FIG. 13A, a real number at 920 MHz is approximately 9Ω, and an imaginary number at 920 MHz is approximately 184Ω. In FIG. 13B, a real number at 920 MHz is approximately 16Ω, and an imaginary number at 920 MHz is approximately 193Ω. Accordingly, it can be seen that the impedance characteristics of the RFID tag 100-4 illustrated in FIG. 13A and FIG. 13B are less disturbed as compared to those of the above-described RFID tag 100A according to the comparative example. Further, it can be seen that the impedance characteristics of the RFID tag 100-4 illustrated in FIG. 13A and FIG. 13B are approximately the same as the impedance characteristics of the RFID tag 100-3, and are not greatly disturbed.

Accordingly, the RFID tag 100-4 can obtain effects similar to those of the RFID tag 100 by combining a plurality of elements having both different electrical lengths and different shapes.

Further, because the RFID tag 100-4 does not include the fourth elements 4, the control of manufacturing tolerances of the fourth elements 4 is not required, and also the structure of the RFID tag 100-4 can be simplified. As a result, the manufacturing yield of the RFID tag 100-4 can be improved, and the manufacturing cost can be further reduced.

Further, the RFID tag 100-4 has a structure in which the branch point of the fifth element 5, namely the point on the second element 2 from which the fifth element 5 extends, can be easily adjusted, thus providing a greater degree of freedom in design conditions. For example, if the container 300 has a special shape in which the surface area of the RFID tag 100-4 needs to be decreased as much as possible, it would be assumed that the area below (area on the negative Y-axis side of) the second element 2 is narrowed. Even in such a case, the fifth element 5 can be applied to a container 300 having a special shape by locating the branch point of the fifth element 5 as close as possible to the loop conductor 20 and decreasing the length of the part, extending in the X-axis direction, of the fifth element 5. Accordingly, because the RFID tag 100-4 can be applied to various types of containers 300, the production volume of the RFID tag 100-4 increases. Thus, the unit price of the RFID tag 100-4 can be further reduced.

Figure 14:
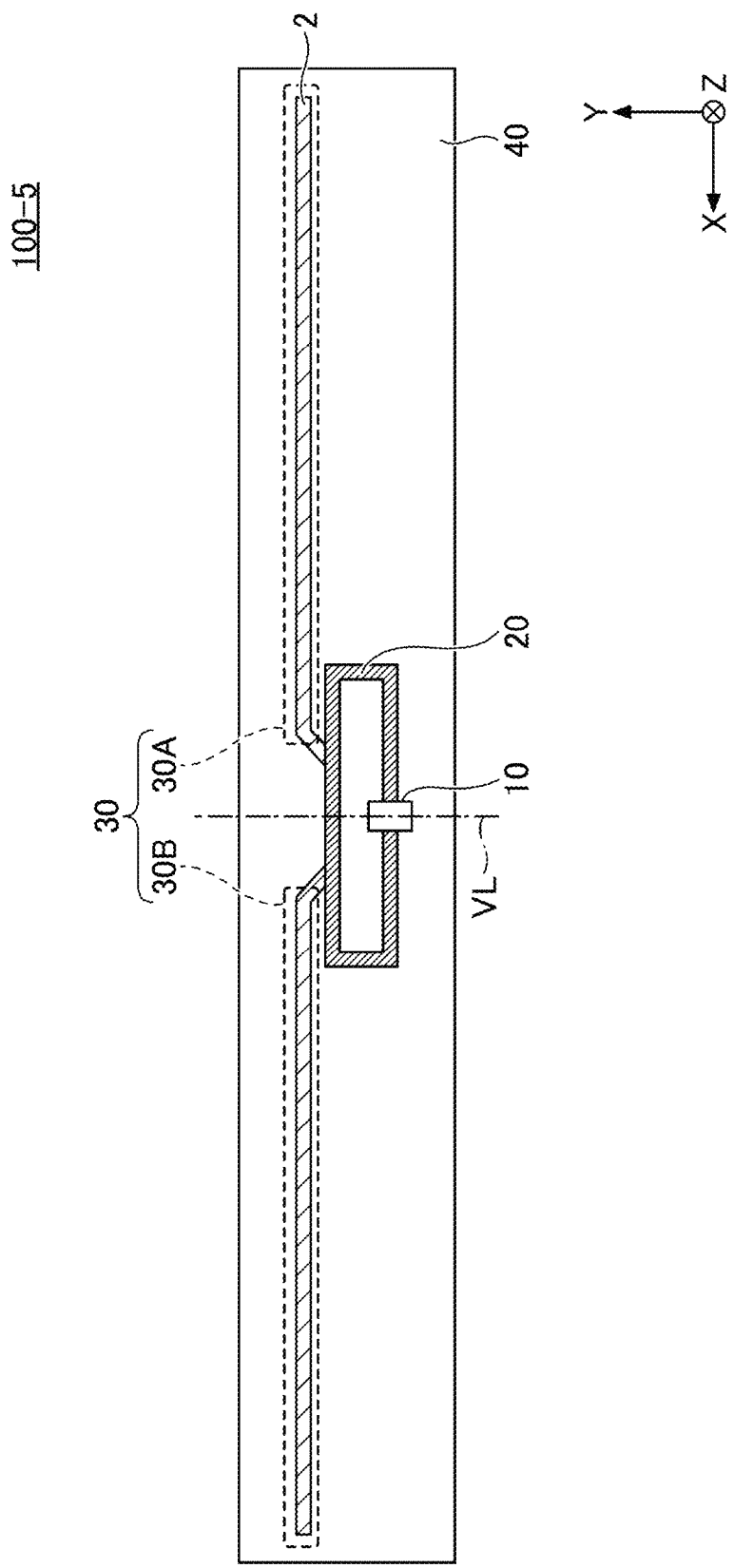
FIG. 14 is an example configuration of a RFID tag according to a fifth modification.

FIG. 14 is an example configuration of a RFID tag 100-5 according to a fifth modification. As compared to the RFID tag 100-4, the RFID tag 100-5 does not include the fifth element 5. In place of a structure that combines a plurality of elements having both different electrical lengths and shapes, the RFID tag 100-5 has a simple structure including the second element 2.

The second element 2 of the RFID tag 100-5 is a conductor having a linear shape and set to have an electrical length that is a multiple of approximately ¼ of the wavelength of the frequency used.

The inventors have confirmed that the impedance characteristics of the RFID tag 100-5 are similar to the impedance characteristics illustrated in FIG. 13A and FIG. 13B. In addition, the inventors have confirmed that the impedance characteristics of the RFID tag 100-5 are less disturbed as compared to the impedance characteristics of the above-described RFID tag 100A according to the comparative example.

The communication distance between the RFID tag 100-5 and the reader tends to decrease as compared to the communication distances between the reader and the RFID tags 100 through 100-4. However, the inventors have confirmed that the practical communication distance (such as approximately 1 m to 7 m) between the RFID tag 100-5 and the reader can be secured. Even if the communication distance decreases, the reader can read identification information by installing the reader on a conveyor belt that carries containers and the like. In this manner, the RFID tag 100-5 can be utilized for inventory control of various products.

It is considered that the reason why the RFID tag 100-5 has superior impedance characteristics is that, because the antenna element is formed in a linear shape, electrical coupling between the antenna element and the liquid is reduced as compared to an antenna element formed in a meandering shape.

Conventionally, in order to secure an electrical length required for wireless communication of an antenna unit 30, an antenna element having a meandering shape, an antenna element having a loop shape, or the like is employed in most cases. However, if such an antenna element is employed, electrical coupling between the antenna element and a liquid would increase, thus causing impedance characteristics to be largely disturbed. Therefore, desired antenna performance would not be obtained. In view of this, measures are conventionally taken, such as decreasing the distance between the antenna element and the container by disposing a spacer between the antenna element and the container so as to reduce electrical coupling, or inserting a metal sheet between the antenna element and the container so as to reduce electrical coupling.

Conversely, the RFID tag 100-5 according to the fifth modification does not require measures as described above. Accordingly, while production control of the RFID tag 100-5 can be simplified, the amount of materials required to manufacture the RFID tag 100-5 can be significantly reduced. Therefore, the manufacturing cost of the RFID tag 100-5 can be significantly reduced.

Figure 15:
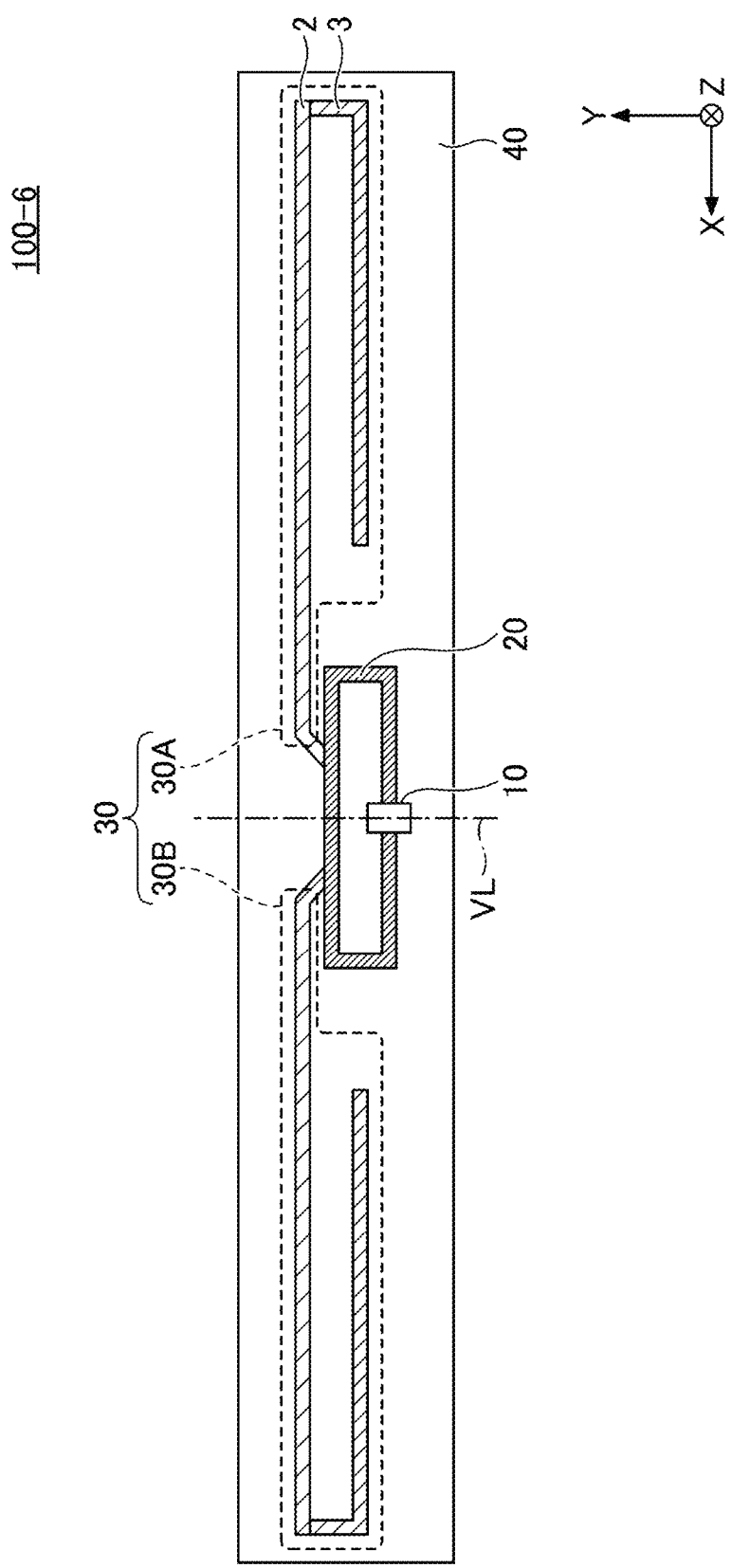
FIG. 15 is an example configuration of a RFID tag according to a sixth modification.

FIG. 15 is an example configuration of a RFID tag 100-6 according to a sixth modification. As compared to the RFID tag 100-3 according to the third modification, the RFID tag 100-6 does not include the fourth elements 4.

The inventors have confirmed that the impedance characteristics of the RFID tag 100-6 are less disturbed as compared to the impedance characteristics of the above-described RFID tag 100A according to the comparative example. In addition, the inventors have confirmed that the communication distance between the RFID tag 100-6 and the reader is similar to the communication distance between the RFID tag 100-3 and the reader.

Further, because the RFID tag 100-6 does not include the fourth elements 4, the control of manufacturing tolerances of the fourth elements 4 is not required, and also the structure of the RFID tag 100-6 can be simplified. As a result, the manufacturing yield of the RFID tag 100-6 can be improved, and the manufacturing cost can be further reduced.

Figure 16:
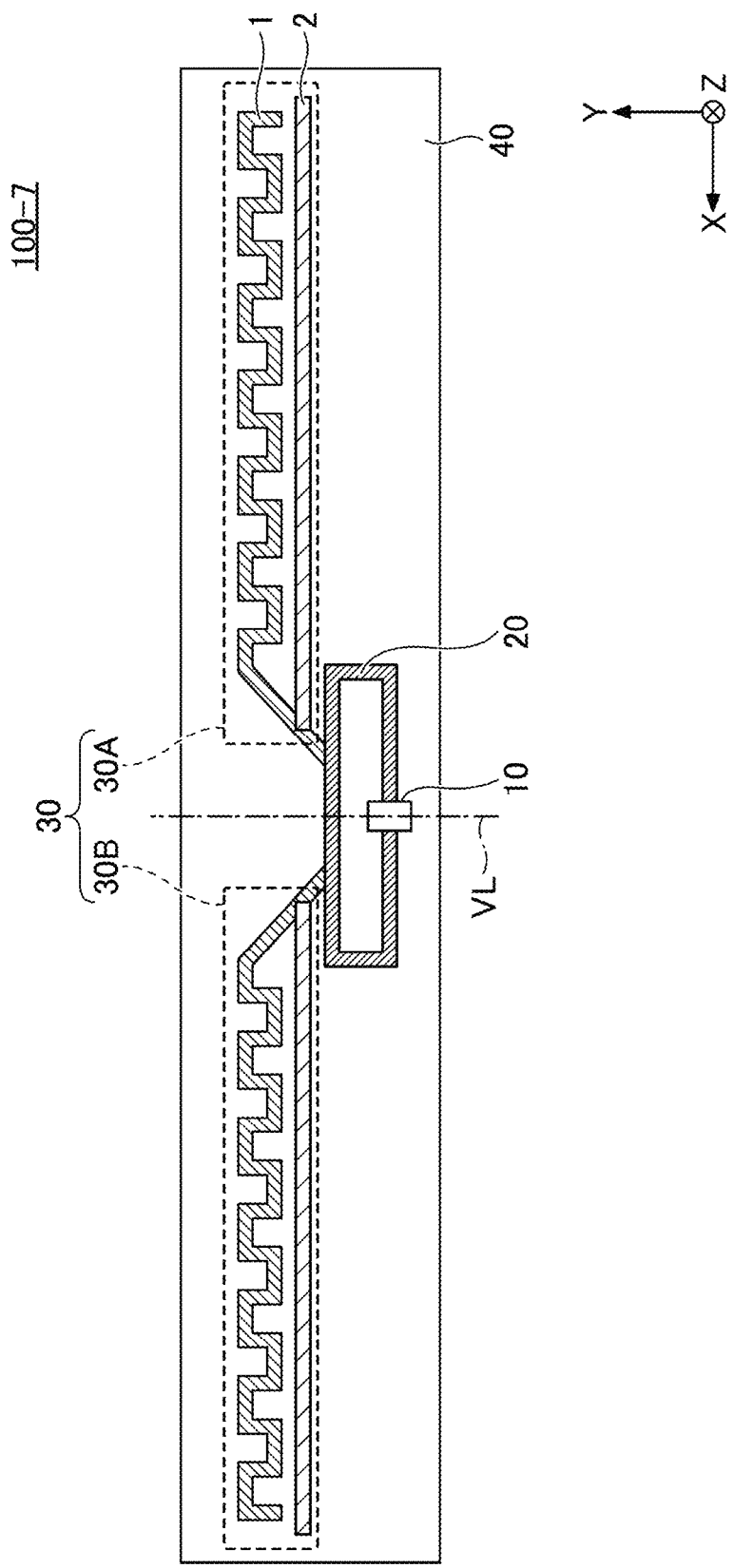
FIG. 16 is an example configuration of a RFID tag according to a seventh modification.

FIG. 16 is an example configuration of a RFID tag 100-7 according to a seventh modification. As compared to the RFID tag 100, the RFID tag 100-7 does not include the third element 3 and the fourth elements 4. If the first element 1 serves as a primary element, the second element 2 serves as a secondary element. If the second element 2 serves as a primary element, the first element 1 serves as a secondary element.

The electrical length of each element is set as follows.

For example, the first element 1 is set to have an electrical length that is a multiple of $\lambda/4$, where $\lambda$ is the wavelength of the frequency used. In this case, the electrical length of the second element 2 is set to be different from the electrical length that is a multiple of $\lambda/4$. The different electrical length ranges from, for example, $\lambda/3.5$ to $\lambda/4.5$, where $\lambda$ is the wavelength of the frequency used.

Instead of the first element 1, the second element 2 may be set to have an electrical length that is a multiple of $\lambda/4$, where $\lambda$ is the wavelength of the frequency used. In this case, the electrical length of the first element 1 is set to be different from the electrical length that is a multiple of $\lambda/4$. The different electrical length ranges from, for example, $\lambda/3.5$ to $\lambda/4.5$, where $\lambda$ is the wavelength of the frequency used.

The inventors have confirmed that the impedance characteristics of the RFID tag 100-7 are less disturbed as compared to the impedance characteristics of the above-described RFID tag 100A according to the comparative example. In addition, the inventors have confirmed that the communication distance between the RFID tag 100-7 and the reader are similar to the communication distance between the RFID tag 100 and the reader.

Because the RFID tag 100-7 does not include the third element 3 and the fourth elements 4, the control of manufacturing tolerances of the third element 3 and the fourth elements 4 is not required, and also the structure of the RFID tag 100-7 can be simplified. As a result, the manufacturing yield of the RFID tag 100-7 can be improved, and the manufacturing cost can be further reduced.

Figure 17:
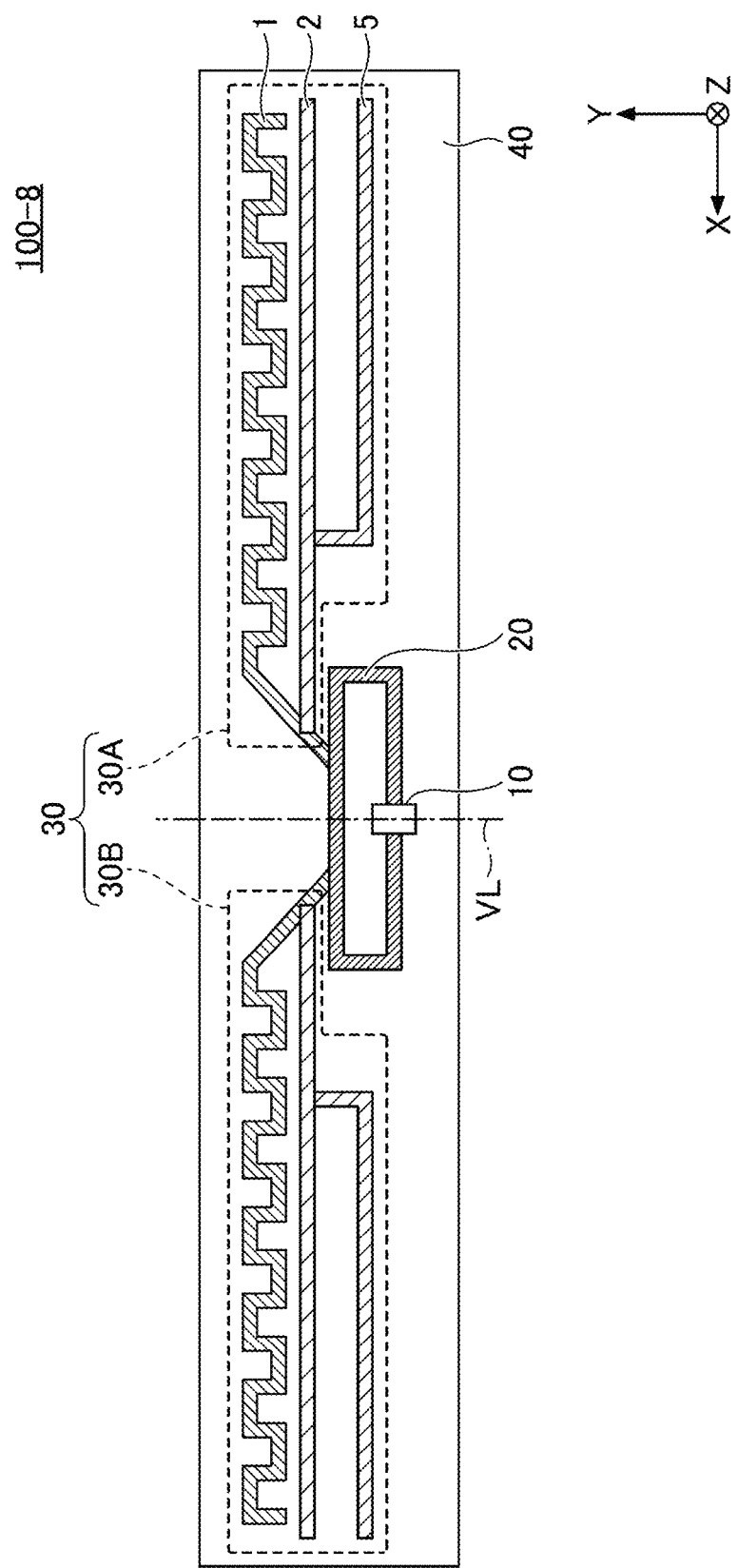
FIG. 17 is an example configuration of a RFID tag according to an eighth modification.

FIG. 17 is an example configuration of a RFID tag 100-8 according to an eighth modification. As compared to the RFID tag 100, the RFID tag 100-8 includes the fifth element 5 in place of the third element 3 and the fourth elements 4. If the first element 1 serves as a primary element, the second element 2 serves as a secondary element. If the second element 2 serves as a primary element, the first element 1 serves as a secondary element.

The electrical length of each element is set as follows.

For example, if the first element 1 is set to have an electrical length that is a multiple of $\lambda/4$, where $\lambda$ is the wavelength of the frequency used, one of the electrical length of the second element 2 and the electrical length of the fifth element 5 is set to be different from the electrical length that is a multiple of $\lambda/4$. The different electrical length ranges from, for example, $\lambda/3.5$ to $\lambda/4.5$, where $\lambda$ is the wavelength of the frequency used.

Further, if the second element 2 is set to have an electrical length that is a multiple of $\lambda/4$, where $\lambda$ is the wavelength of the frequency used, one of the electrical length of the first element 1 and the electrical length of the fifth element 5 is set to be different from the electrical length that is a multiple of $\lambda/4$. The different electrical length ranges from, for example, $\lambda/3.5$ to $\lambda/4.5$, where $\lambda$ is the wavelength of the frequency used.

Further, if the fifth element 5 is set to have an electrical length that is a multiple of $\lambda/4$, where $\lambda$ is the wavelength of the frequency used, one of the electrical length of the first element 1 and the electrical length of the second element 2 is set to be different from the electrical length that is a multiple of $\lambda/4$. The different electrical length ranges from, for example, $\lambda/3.5$ to $\lambda/4.5$, where $\lambda$ is the wavelength of the frequency used.

The inventors have confirmed that the impedance characteristics of the RFID tag 100-8 are less disturbed as compared to the impedance characteristics of the above-described RFID tag 100A according to the comparative example. In addition, the inventors have confirmed that the communication distance between the RFID tag 100-8 and the reader are similar to the communication distance between the RFID tag 100 and the reader.

Because the RFID tag 100-8 does not include, for example, the fourth elements 4, the control of manufacturing tolerances of the fourth elements 4 is not required, and also the structure of the RFID tag 100-8 can be simplified. As a result, the manufacturing yield of the RFID tag 100-8 can be improved, and the manufacturing cost can be further reduced.

Note that each of the RFID tags 100 through 100-8 is applicable to not only radio waves in the UHF band, but also radio waves in the very high frequency (VHF) band, radio waves in the super high frequency (SHF) band, and the like. If the frequency used for the RFID tags 100 through 100-8 is in the UHF band of, for example, 860 to 960 MHz or 915 to 925 MHz, the antenna size can be advantageously reduced because the UHF band has a higher frequency and a shorter wavelength than the VHF band. Accordingly, each of the RFID tags 100 through 100-8 according to the embodiments can be made suitable for radio waves in the UHF band. Therefore, the size of the IC chip 10 can be reduced, and a wireless tag having a small memory capacity can be obtained at reduced cost.

Further, each of the RFID tags 100 through 100-8 may be a wireless tag of an electromagnetic induction type or a wireless tag of a radio wave type. In particular, if each of the RFID tags 100 through 100-8 is a wireless tag of a radio wave type, a predetermined wireless communication distance from a reader can be secured. The predetermined wireless communication distance is in a range from 0 m to 20 m, for example.

Further, each of the RFID tags 100 through 100-8 can use radio waves in the UHF band, the VHF band, or the SHF band for wireless communication regardless of whether each of the RFID tags 100 through 100-8 is present in the air (ambient air) or in water. For example, the RFID tags 100 through 100-8 can be used for wireless communication with readers even if containers 300 having the RFID tags 100 through 100-8 are placed in buckets that contain water and in buckets that does not contain water. In the following, a RFID tag 100-9 according to a ninth modification having the same technical features as those of the RFID tags 100 through 100-8 will be described. Specifically, an example in which the RFID tag 100-9 can be used for wireless communication even when the RFID tag 100-9 is present in the air or in water will be described.

Figure 18A:
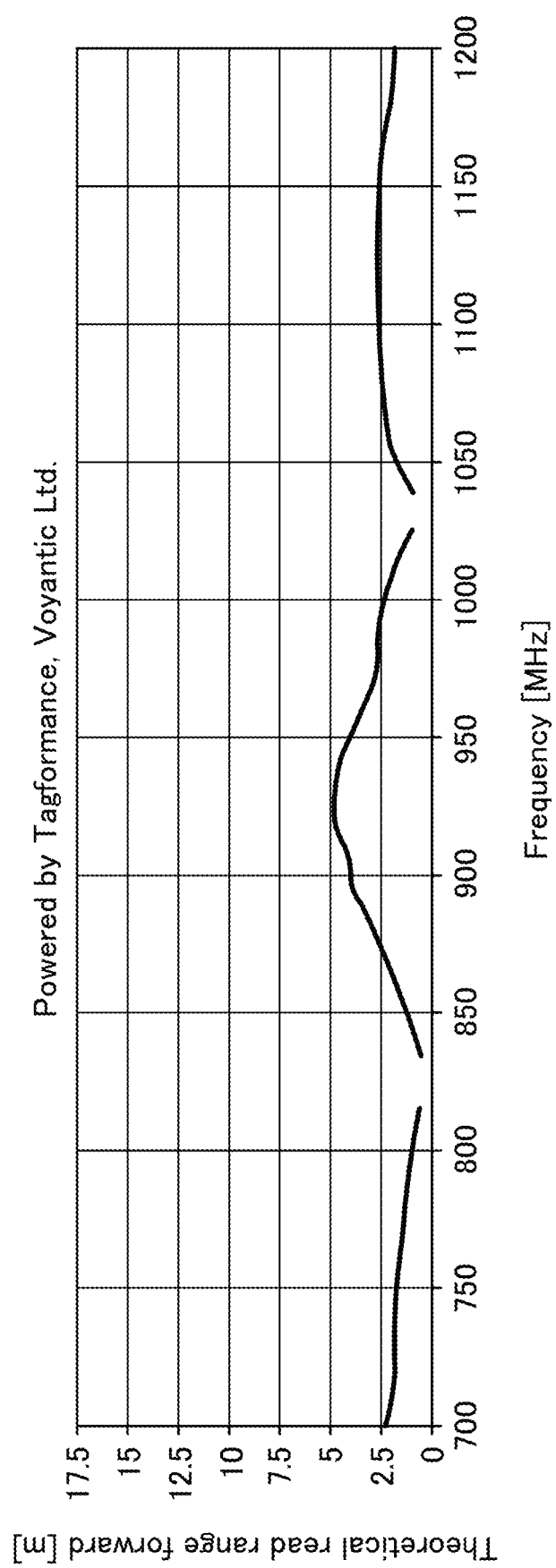
FIG. 18A is a first diagram illustrating the frequency characteristics of a RFID tag provided in the air.
Figure 18B:
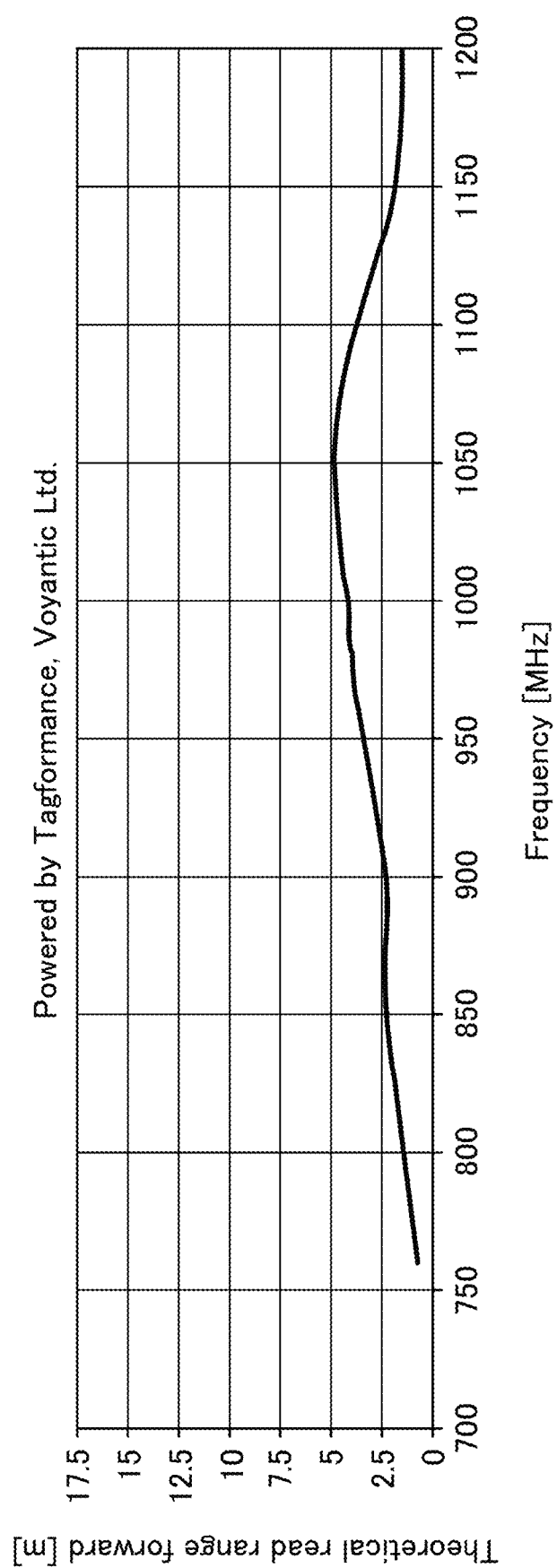
FIG. 18B is a second diagram illustrating the frequency characteristics of the RFID tag in the air.
Figure 18C:
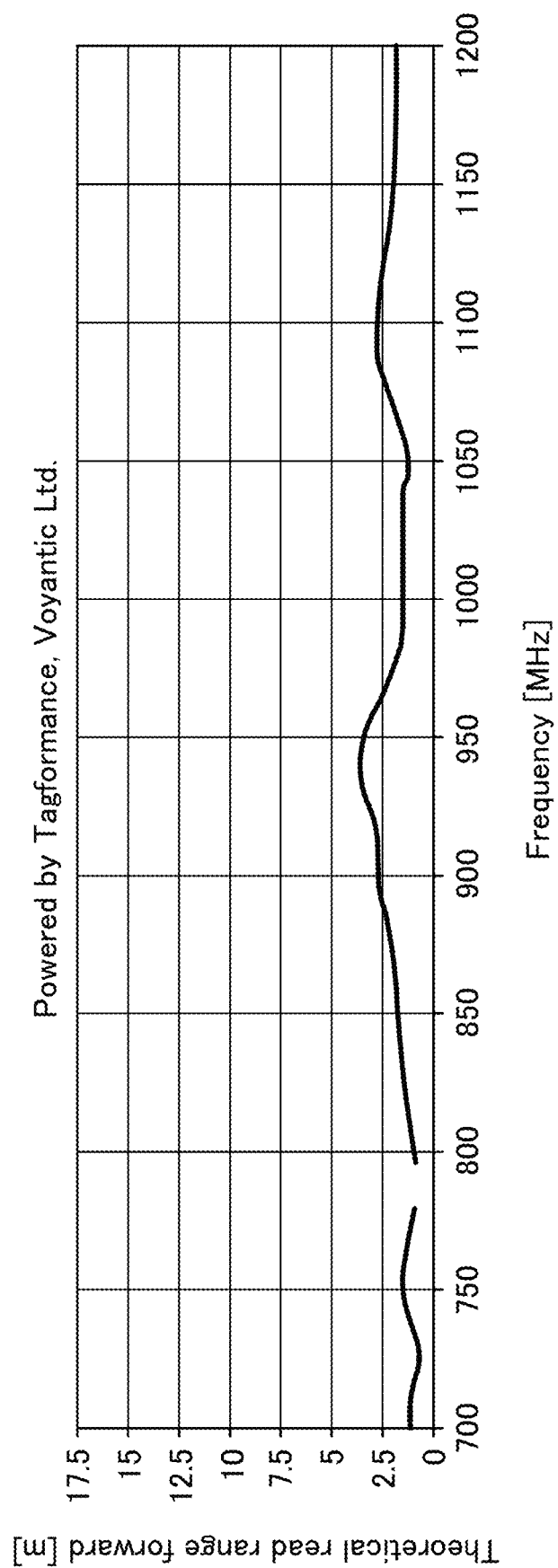
FIG. 18C is a third diagram illustrating the frequency characteristics of the RFID tag in the air.
Figure 18D:
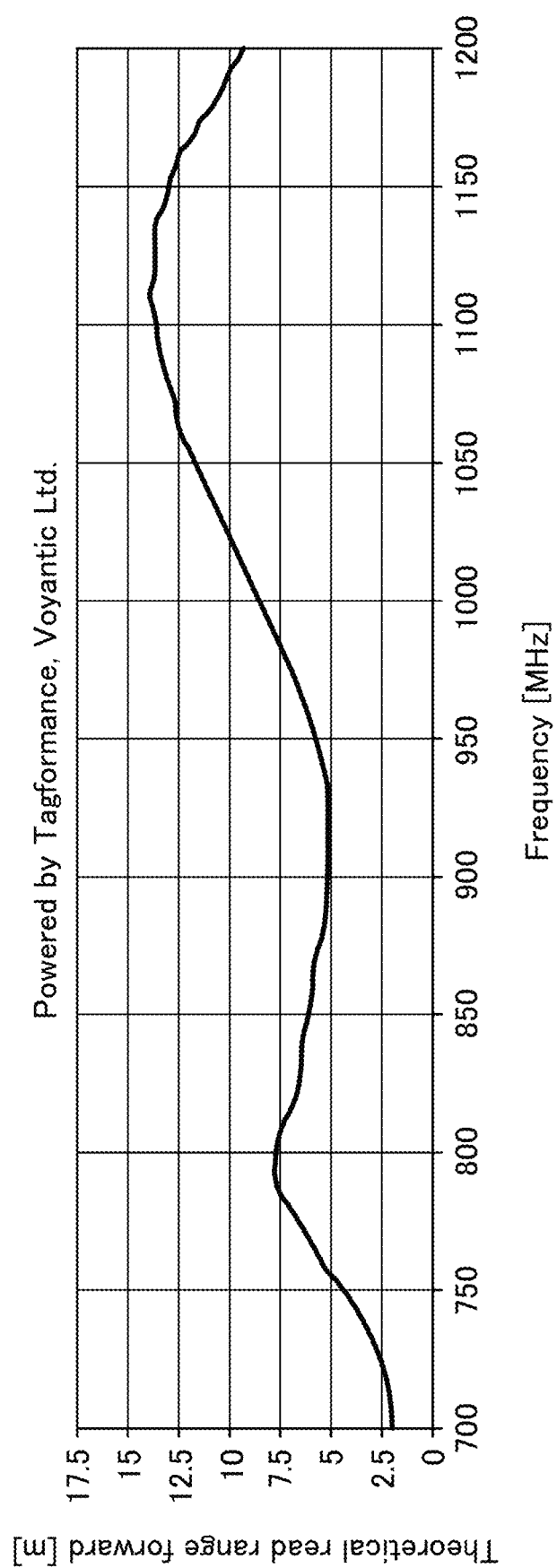
FIG. 18D is a fourth diagram illustrating the frequency characteristics of the RFID tag in the air.
Figure 18E:
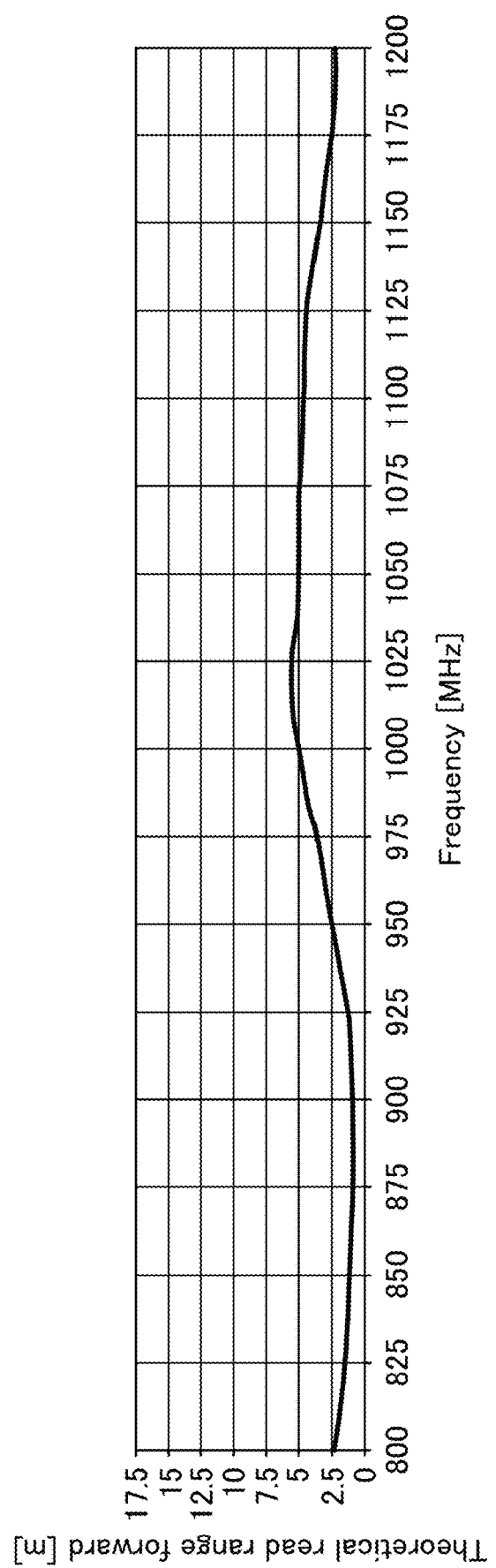
FIG. 18E is a fifth diagram illustrating the frequency characteristics of the RFID tag in the air.

FIG. 18A is a first diagram illustrating the frequency characteristics of a RFID tag provided in the air. FIG. 18B is a second diagram illustrating the frequency characteristics of the RFID tag provided in the air. FIG. 18C is a third diagram illustrating the frequency characteristics of the RFID tag provided in the air. FIG. 18D is a fourth diagram illustrating the frequency characteristics of the RFID tag provided in the air. FIG. 18E is a fifth diagram illustrating the frequency characteristics of the RFID tag provided in the air.

FIG. 18A through FIG. 18E depict frequency characteristics of the RFID tag 100-9 provided in the air. In FIG. 18A through FIG. 18E, the horizontal axis represents the frequency of a radio wave for wireless communication, and the vertical axis represents the communicable distance between the RFID tag 100-9 and a reader. The configuration of the RFID tag 100-9 will be described later in detail.

FIG. 18A depicts data of the RFID tag 100-9 attached to a 500-ml PET bottle (not frozen) that contains a liquid. As can be seen from FIG. 18A, for the 500-ml PET bottle, a resonant frequency band of, for example, 830 MHz to 1040 MHz can be secured when the communicable distance is 10 cm or more.

FIG. 18B depicts data of the RFID tag 100-9 attached to a 900-ml glass bottle that contains alcohol (such as ethanol in water at a concentration of 25%). As can be seen from FIG. 18B, for the 900-ml glass bottle, a resonant frequency band of, for example, 740 MHz to 1200 MHz can be secured when the communicable distance is 10 cm or more.

FIG. 18C depicts data of the RFID tag 100-9 attached to a 1000-ml paper container that contains water. As can be seen from FIG. 18C, for the 1000-ml paper container, a resonant frequency band of, for example, 780 MHz to 1200 MHz can be secured when the communicable distance is 10 cm or more.

FIG. 18D depicts data of the RFID tag 100-9 attached to a 1500-ml PET bottle that contains a vegetable oil (manufactured by The Nisshin OilliO Group, Ltd.). As can be seen from FIG. 18D, for the 1500-ml PET bottle, a resonant frequency band of, for example, 700 MHz to 1200 MHz can be secured when the communicable distance is 10 cm or more.

FIG. 18E depicts data of the RFID tag 100-9 attached to a 500-ml PET bottle (frozen) that contains a liquid. As can be seen from FIG. 18E, for the frozen PET bottle, a resonant frequency band of, for example, 700 MHz to 1200 MHz can be secured when the communicable distance is 10 cm or more.

Next, a 500-ml PET bottle to which the RFID tag 100-9 is attached is placed in a bucket, and water is poured into the bucket. The frequency characteristics of the RFID tag 100-9 before and after water is poured into the bucket will be described with reference to FIG. 19A through FIG. 20D.

Figure 19A:
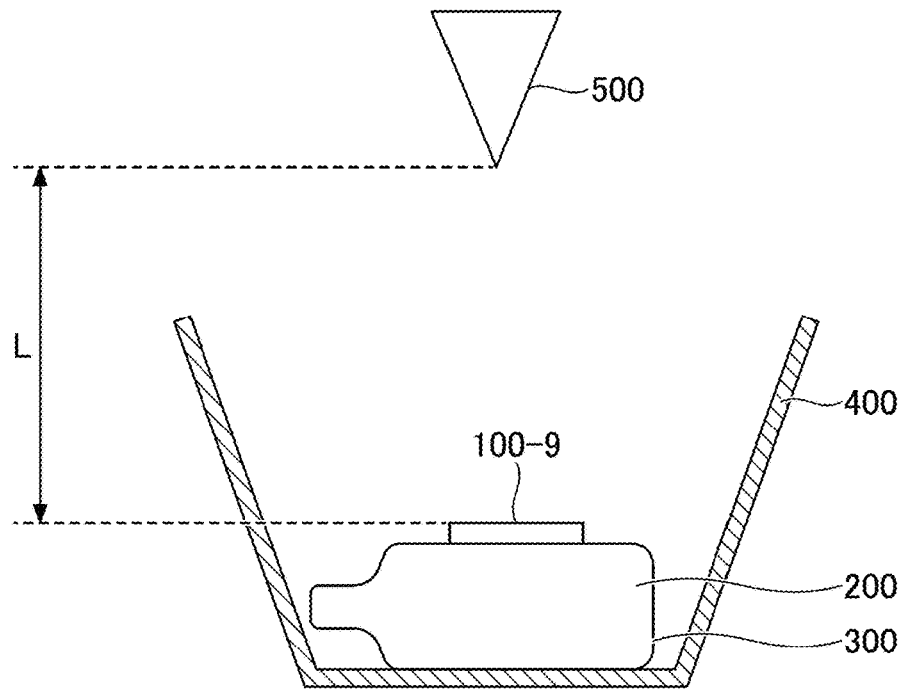
FIG. 19A is a first diagram illustrating the frequency characteristics of the RFID tag that can be used in the air and in water.
Figure 19B:
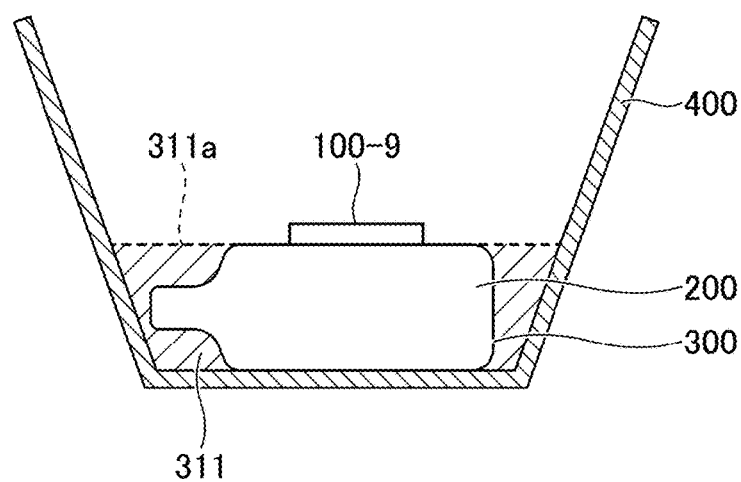
FIG. 19B is a second diagram illustrating the frequency characteristics of the RFID tag that can be used in the air and in water.
Figure 19C:
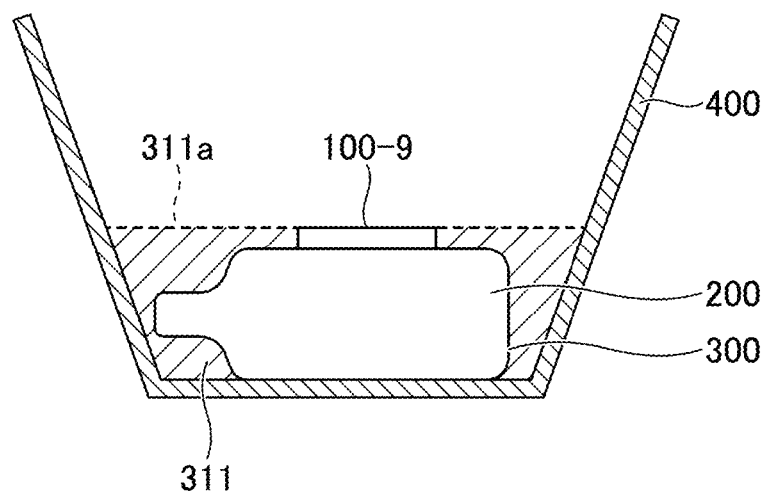
FIG. 19C is a third diagram illustrating the frequency characteristics of the RFID tag that can be used in the air and in water.
Figure 19D:
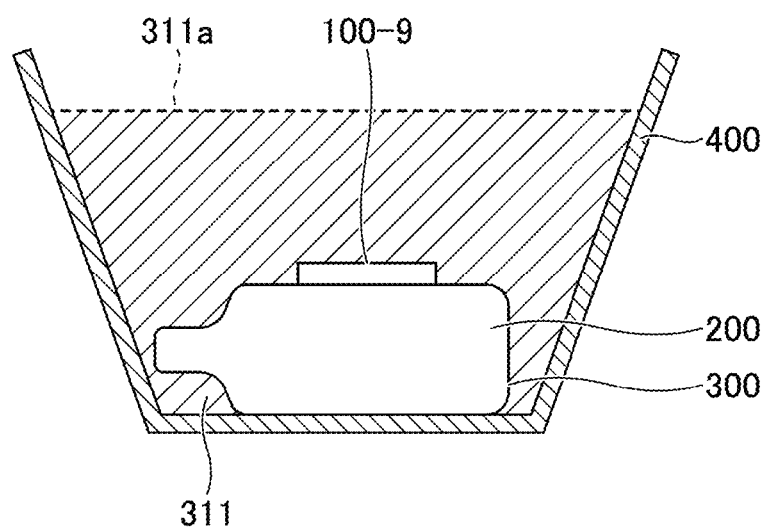
FIG. 19D is a fourth diagram illustrating the frequency characteristics of the RFID tag that can be used in the air and in water.

FIG. 19A is a first diagram illustrating the frequency characteristics of the RFID tag that can be used in the air and in water. FIG. 19B is a second diagram illustrating the frequency characteristics of the RFID tag that can be used in the air and in water. FIG. 19C is a third diagram illustrating the frequency characteristics of the RFID tag that can be used in the air and in water. FIG. 19D is a fourth diagram illustrating the frequency characteristics of the RFID tag that can be used in the air and in water.

As illustrated in FIG. 19A through FIG. 19D, a 500-ml PET bottle (container 300) is placed in a bucket (container 400) that can contain water 311. FIG. 19A depicts the container 400 that does not contain water 311, and FIG. 19B and FIG. 19C depict the container 400 that contains water 311.

The amount of the water 311 becomes greater in the order of FIG. 19B, FIG. 19C, and FIG. 19D. FIG. 19B depicts a state immediately before the RFID tag 100-9 is submerged in the water 311, that is, a state in which the RFID tag 100-9 is not submerged in the water 311 while most of the container 300 is submerged in the water 311. FIG. 19C depicts a state immediately after the RFID tags 100-9 are submerged in the water 311, that is, a state in which a small amount of water 311 is present on the top surface of the RFID tags 100-9. The state in which a small amount of water 311 is present on the top surface of the RFID tags 100-9 may refer to a state in which the distance between the top surface of the RFID tag 100-9 and a water surface 311a is approximately 1 mm to 1 cm. FIG. 19D depicts a state in which the amount of the water 311 is greater than that of the state illustrated in FIG. 19C, and for example, the distance between the RFID tag 100-9 and the water surface 311a is approximately 15 cm.

Figure 20A:
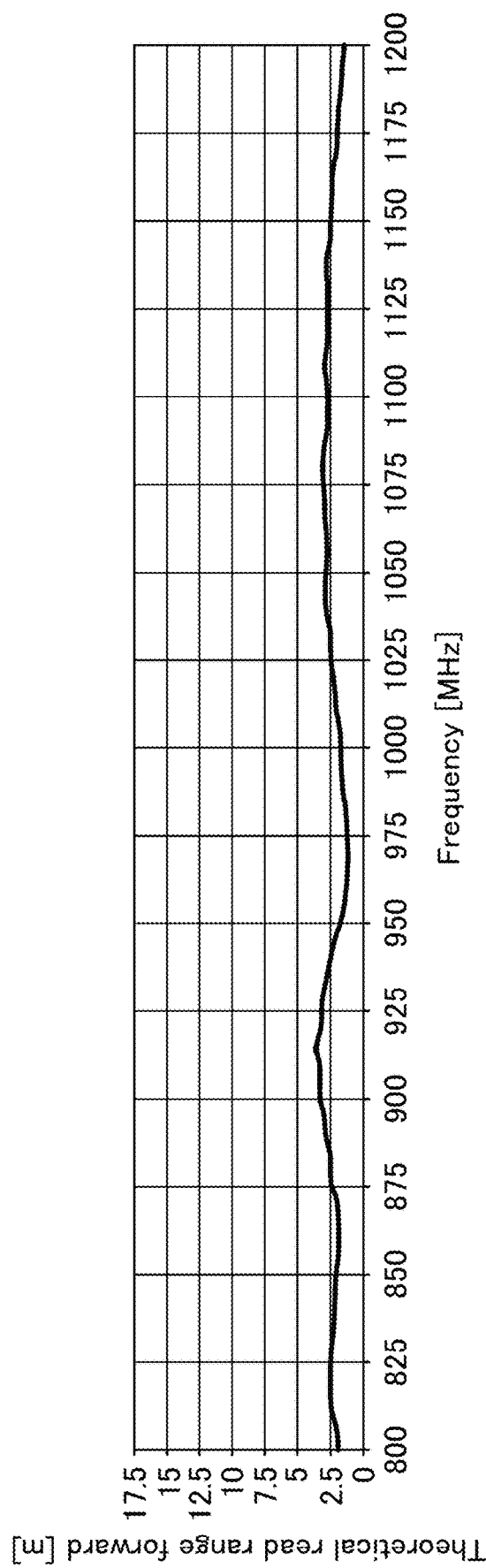
FIG. 20A is a diagram illustrating the frequency characteristics of the RFID tag illustrated in FIG. 19A.
Figure 20B:
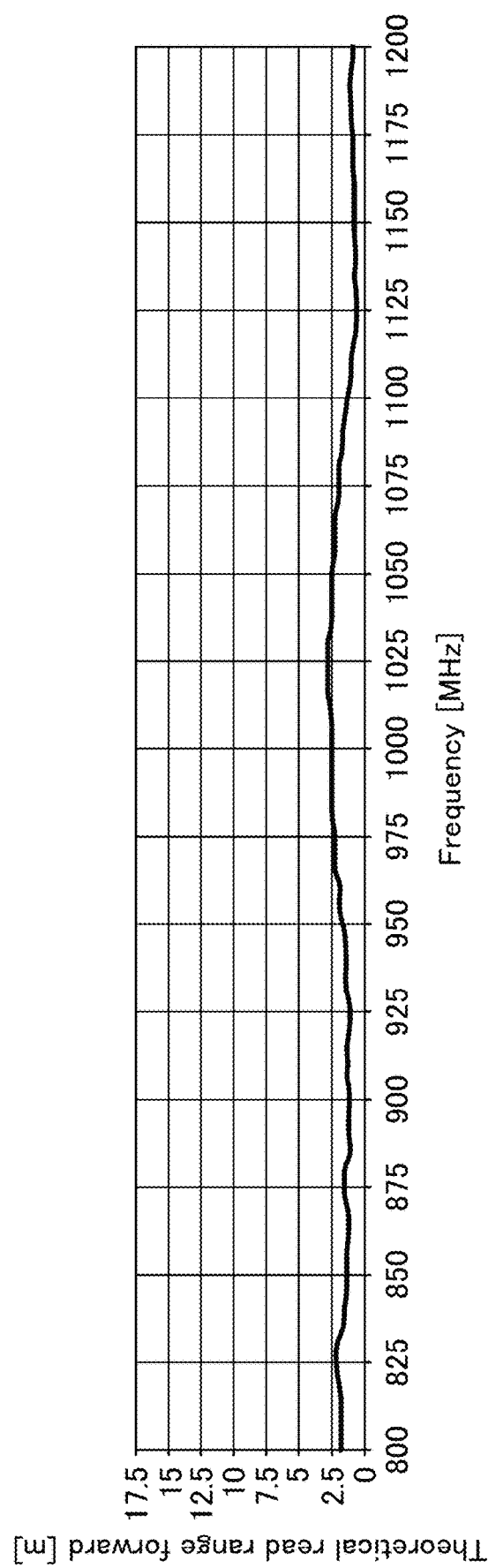
FIG. 20B is a diagram illustrating the frequency characteristics of the RFID tag illustrated in FIG. 19B.
Figure 20C:
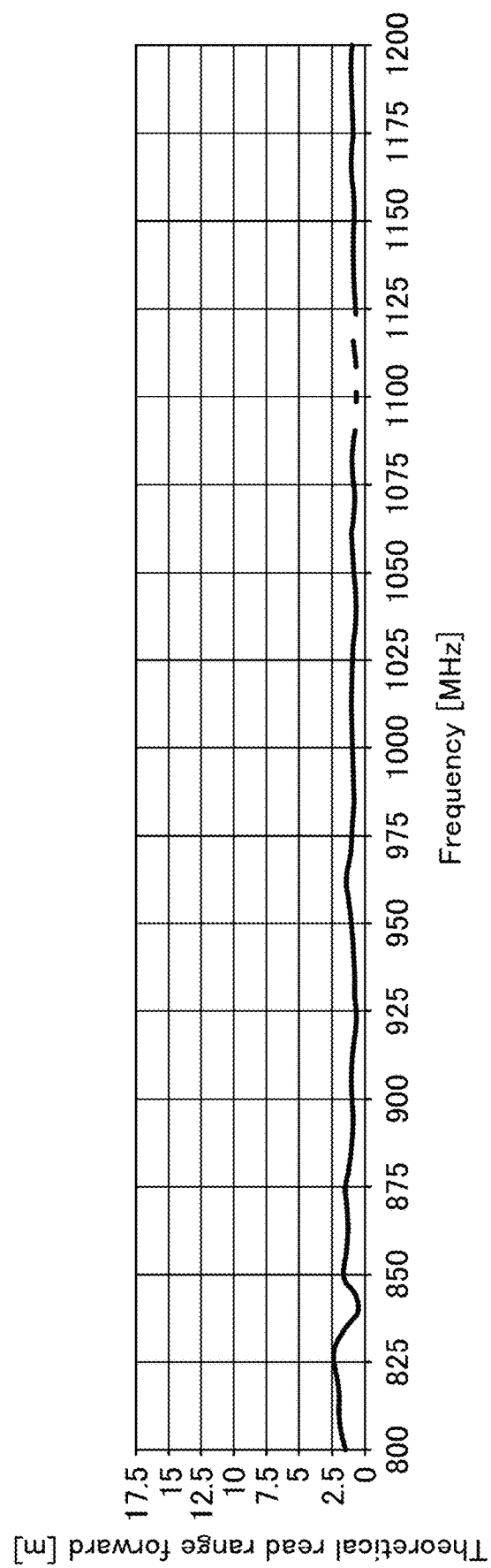
FIG. 20C is a diagram illustrating the frequency characteristics of the RFID tag illustrated in FIG. 19C.
Figure 20D:
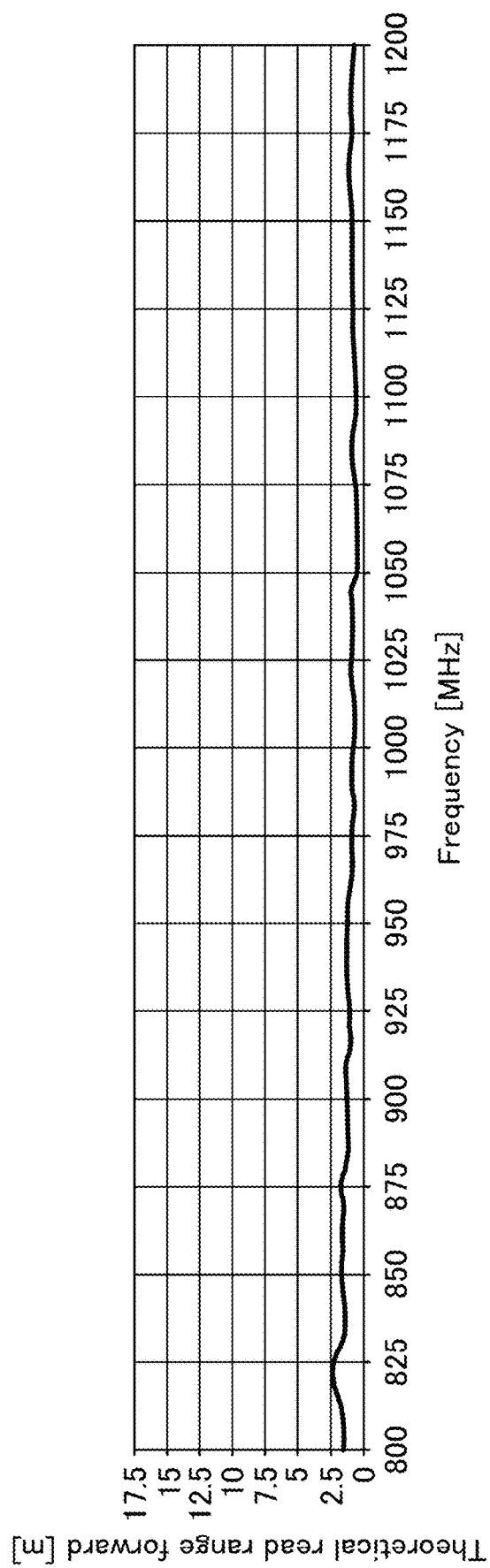
FIG. 20D is a diagram illustrating the frequency characteristics of the RFID tag illustrated in FIG. 19D.

The frequency characteristics of the RFID tag 100-9 measured in the above-described states are depicted in FIG. 20A through FIG. 20D. FIG. 20A is a diagram illustrating the frequency characteristics of the RFID tag illustrated in FIG. 19A. FIG. 20B is a diagram illustrating the frequency characteristics of the RFID tag illustrated in FIG. 19B. FIG. 20C is a diagram illustrating the frequency characteristics of the RFID tag illustrated in FIG. 19C. FIG. 20D is a diagram illustrating the frequency characteristics of the RFID tag illustrated in FIG. 19D. In each of the drawings, the horizontal axis represents the frequency of a radio wave for wireless communication, and the vertical axis represents the communication distance between the RFID tag 100-9 and a reader. Note that data illustrated in FIG. 20A through FIG. 20D is measured when the distance L between the RFID tag 100-9 and an antenna 500 for the reader is 25 cm, as illustrated in FIG. 19A.

FIG. 20A illustrates the frequency characteristics of the RFID tag in the state illustrated in FIG. 19A. As can be seen from FIG. 20A, when no water 311 is contained in the container 400, a wide resonant frequency band of 800 MHz to 1200 MHz can be secured when the communicable distance is 10 cm or more.

FIG. 20B illustrates the frequency characteristics of the RFID tag in the state illustrated in FIG. 19B. As can be seen from FIG. 20B, when the RFID tag 100-9 is not submerged in the water 311, a wide resonant frequency band of 800 MHz to 1200 MHz can be secured when the communicable distance is 10 cm or more.

FIG. 20C illustrates the frequency characteristics of the RFID tag in the state illustrated in FIG. 19C. As can be seen from FIG. 20C, when the RFID tag 100-9 is slightly submerged in the water 311, a wide communication distance can be secured except for a frequency of about 840 MHz and a frequency of around 1100 MHz, although the communicable distance decreases as compared to that illustrated in FIG. 20B.

FIG. 20D illustrates the frequency characteristics of the RFID tag in the state illustrated in FIG. 19D. As can be seen from FIG. 20D, a wide communication distance can be secured even when the distance between the RFID tag 100-9 and the water surface 311a increases.

Note that, although data is not depicted, it has been verified that wireless communication using the RFID tag 100-9 is possible even when the distance between the RFID tag 100-9 and the water surface 311a exceeds 15 cm, for example, when the distance between the RFID tag 100-9 and the water surface 311a is up to approximately 30 cm.

Figure 21:
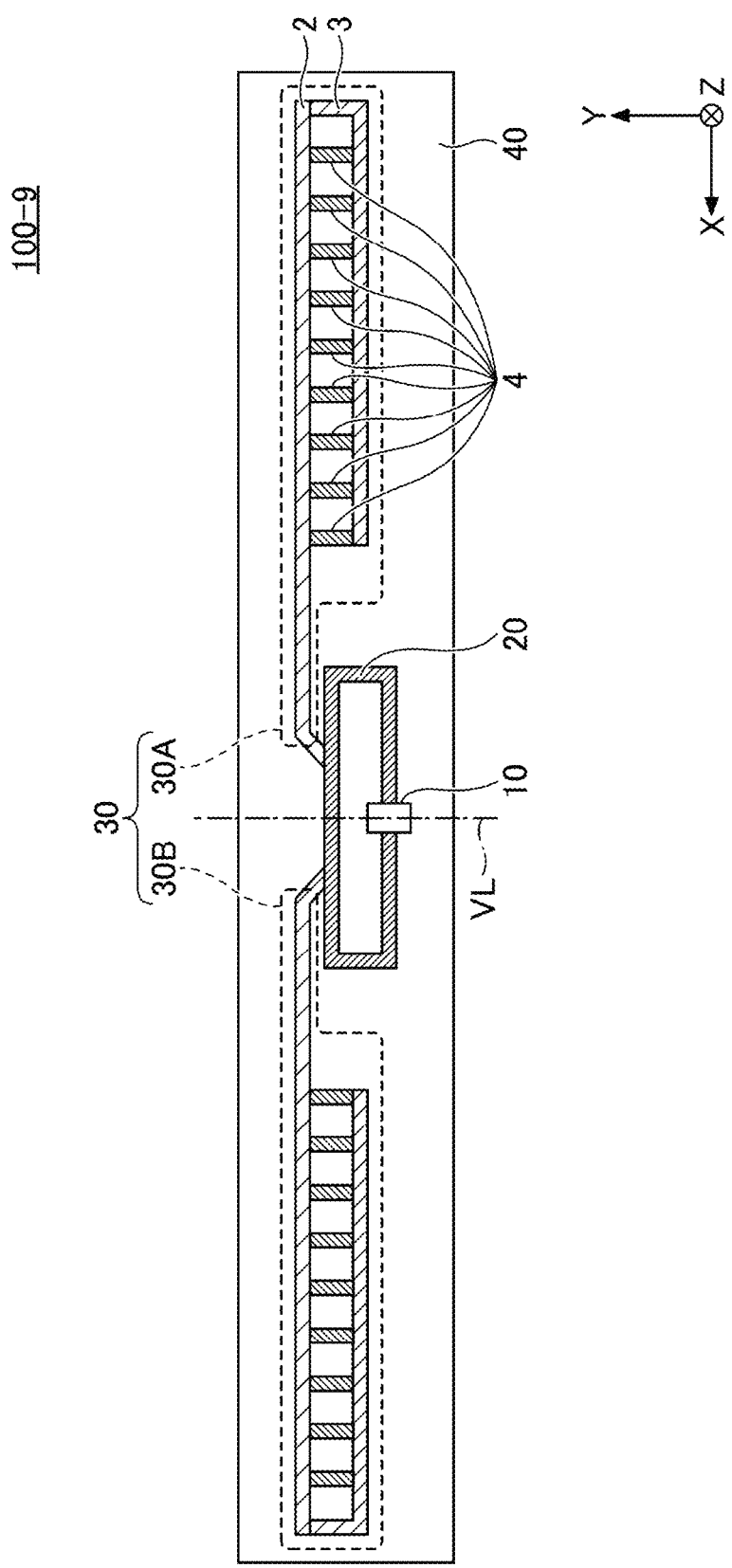
FIG. 21 is a diagram illustrating an example configuration of the RFID tag according to a ninth modification.

FIG. 21 is a diagram illustrating an example configuration of the FID tag 100-9 according to the ninth modification. The RFID tag 100-9 differs from the RFID tag 100-2 illustrated in FIG. 8 in that the RFID tag 100-9 includes a larger number of fourth elements 4.

In the RFID tag 100-9, electrical coupling between antenna elements and the liquid can be reduced. Further, in the RFID tag 100-9, a plurality of elements having different electrical lengths are combined, thus allowing deviations from the resonance conditions to be corrected. Accordingly, a matching circuit that is robust to the effect of shortening the wavelength can be obtained. Further, in the RFID tag 100-9, the plurality of antenna elements having different electrical lengths are combined, thus allowing the strength of a radio wave received by the antenna unit 30 to be increased. In particular, because the RFID tag 100-9 includes the larger number of fourth elements 4, the strength of a radio wave received by the antenna unit 30 can be increased even when the RFID tag 100-9 is used in water. Further, while the RFID tag 100-9 is basically expected to be used in the air, the RFID tag 100-9 can also be used in water for inventory control at a stall or the like. In this case, the RFID tag 100-9 can be attached to a PET bottle, and the PET bottle is submerged in a container that contains water and ice for cooling the PET bottle. Accordingly, in order to check the inventory of PET bottles, there is no need to take the PET bottles out of the container that contains water, ice, and the like. In addition, even if PET bottles or the like are submerged due to earthquakes, floods, or the like, the inventory of the submerged PET bottles or the like can be checked.

The configurations illustrated in the above-described embodiments are merely examples, and may be combined with other known technologies, or some of the configurations may be omitted or changed without departing from the scope of the present invention.

This application is based on and claims priority to Japanese Patent Application No. 2019-134033, filed on Jul. 19, 2019, and Japanese Patent Application No. 2019-195734, filed on Oct. 28, 2019, the entire contents of which are incorporated herein by reference.

DESCRIPTION OF THE REFERENCE NUMERALS 1 first element
2 second element
3 third element
4 fourth element
5 fifth element
10 IC chip
20 loop conductor
30 antenna unit
30A conductor unit
30B conductor unit
31 element
40 sheet
100 RFID tag
100-1 RFID tag
100-2 RFID tag
100-3 RFID tag
100-4 RFID tag
100-5 RFID tag
100-6 RFID tag
100-7 RFID tag
100-8 RFID tag
100-9 RFID tag
200 liquid
300 container
301 cap
302 label

The invention claimed is:

1. A radio frequency identification (RFID) tag for placement on a surface of a container that contains a liquid, the RFID tag comprising:
an IC chip configured to store identification information;
a loop conductor connected to the IC chip; and
an antenna unit that includes a first element including a pair of straight line-shaped conductors directly connected to the loop conductor and a second element including a pair of meandering-shaped conductors directly connected to the loop conductor; wherein
one of the straight line-shaped conductors and one of the meandering-shaped conductors extend from the loop conductor in one direction,
the other of the straight line-shaped conductors and the other of the meandering-shaped conductors extend from the loop conductor in an opposite direction of the one direction,
the first element and the second element have different electrical lengths from each other, one of which is an integer multiple of approximately ¼ of a wavelength of a frequency used.

2. The RFID tag according to claim 1, wherein the antenna unit includes a branch element, the branch element being a conductor branching off from a middle of the one of the straight line-shaped conductors and extending in parallel to the one of the straight line-shaped conductors, and
the branch element has an electrical length that is different from the integer multiple of approximately ¼ of the wavelength of the frequency used.

3. The RFID tag according to claim 2, wherein the antenna unit includes a grid element, the grid element being a conductor extending from the one of the straight line-shaped conductors to the branch element, and
the grid element, the straight linear element, and the branch element together form a grid pattern.

4. The RFID tag according to claim 1, wherein the antenna unit includes a hook element, the hook element being a hook-shaped conductor connected to a tip of the one of the straight line-shaped conductors and extending in a direction different from the one direction, and
the hook element has an electrical length that is different from the integer multiple of approximately ¼ of the wavelength of the frequency used.

5. The RFID tag according to claim 4, wherein the antenna unit includes a grid element that is a conductor extending from the straight linear element to the hook element, and
the grid element, the one of the straight line-shaped conductors, and the hook element together form a grid pattern.

6. The RFID tag according to claim 1, wherein the frequency used is a frequency (860 MHz to 960 MHZ) in an ultra high frequency (UHF) band.

7. The RFID tag according to claim 1, wherein the RFID tag is a wireless tag of a radio wave type.

8. The RFID tag according to claim 1, wherein the RFID tag is capable of maintaining wireless communication functionality in air environments.

9. The RFID tag according to claim 1, wherein the RFID tag is capable of maintaining wireless communication functionality in both air environments and in water.

10. The RFID tag according to claim 1, wherein the RFID tag is capable of maintaining wireless communication functionality in water.

11. The RFID tag according to claim 1, wherein the frequency used is a frequency (915 MHz to 925 MHz) in an ultra high frequency (UHF) band.

12. The RFID tag according to claim 1, wherein the liquid is any one of water, oil, and alcohol.

13. The RFID tag according to claim 1, wherein the liquid is a mixture of any of water, oil, and alcohol.

14. A polyethylene terephthalate (PET) bottle comprising, the RFID tag according to claim 1.

15. An antenna for use with the RFID tag according to claim 1.

* * * * *